(12) United States Patent
Fiatal

(10) Patent No.: US 8,862,657 B2
(45) Date of Patent: Oct. 14, 2014

(54) POLICY BASED CONTENT SERVICE

(75) Inventor: Trevor Fiatal, Fremont, CA (US)

(73) Assignee: Seven Networks, Inc., San Carlos, CA (US)

( * ) Notice: Subject to any disclaimer, the term of this patent is extended or adjusted under 35 U.S.C. 154(b) by 838 days.

(21) Appl. No.: 12/011,396

(22) Filed: Jan. 25, 2008

(65) Prior Publication Data

US 2009/0164560 A1   Jun. 25, 2009

(51) Int. Cl.
*G06F 15/16* (2006.01)
*H04L 29/06* (2006.01)
*G06F 17/30* (2006.01)

(52) U.S. Cl.
CPC ............................... *G06F 17/30905* (2013.01)
USPC .................. 709/203; 709/219; 455/414.3

(58) Field of Classification Search
USPC ................. 709/203, 219; 455/414.3
See application file for complete search history.

(56) References Cited

U.S. PATENT DOCUMENTS

| | | | |
|---|---|---|---|
| 222,458 | A | 12/1879 | Connolly et al. |
| 447,918 | A | 3/1891 | Strowger |
| 4,200,770 | A | 4/1980 | Hellman et al. |
| 4,255,796 | A | 3/1981 | Gabbe et al. |
| 4,276,597 | A | 6/1981 | Dissly et al. |
| 4,531,020 | A | 7/1985 | Wechselberger et al. |
| 4,807,182 | A | 2/1989 | Queen |
| 4,831,582 | A | 5/1989 | Miller et al. |
| 4,875,159 | A | 10/1989 | Cary et al. |
| 4,897,781 | A | 1/1990 | Chang et al. |
| 4,972,457 | A | 11/1990 | O'Sullivan |
| 5,008,853 | A | 4/1991 | Bly et al. |
| 5,159,624 | A | 10/1992 | Makita |
| 5,220,657 | A | 6/1993 | Bly et al. |
| 5,263,157 | A | 11/1993 | Janis |
| 5,283,856 | A | 2/1994 | Gross et al. |
| 5,357,431 | A | 10/1994 | Nakada et al. |
| 5,384,892 | A | 1/1995 | Strong |
| 5,386,564 | A | 1/1995 | Shearer et al. |
| 5,392,390 | A | 2/1995 | Crozier |
| 5,434,994 | A | 7/1995 | Shaheen et al. |
| 5,436,960 | A | 7/1995 | Campana, Jr. et al. |
| 5,438,611 | A | 8/1995 | Campana, Jr. et al. |

(Continued)

FOREIGN PATENT DOCUMENTS

| | | |
|---|---|---|
| CA | 2658185 A1 | 9/2009 |
| CA | 2806527 A1 | 2/2012 |

(Continued)

OTHER PUBLICATIONS

Gameline, "Gameline Advertisement", Published 1982.

(Continued)

*Primary Examiner* — Ranodhi Serrao
(74) *Attorney, Agent, or Firm* — Nifong, Kiefer and Klinck, PLLC

(57) ABSTRACT

Serving user selected content in accordance with a service policy is disclosed. The user may select content from a content source to be accessed at a mobile device. The desired content is modified as necessary such that transmission of the content complies with a policy. Alternatively, only content that complies with the policy may be made available for selection. The manner in which a policy is defined and the content provided may be determined by various factors including mobile device capabilities, user preferences, and network conditions.

27 Claims, 5 Drawing Sheets

(56) References Cited

U.S. PATENT DOCUMENTS

| | | |
|---|---|---|
| 5,479,472 A | 12/1995 | Campana, Jr. et al. |
| 5,487,100 A | 1/1996 | Kane |
| 5,491,703 A | 2/1996 | Barnaby et al. |
| 5,493,692 A | 2/1996 | Theimer et al. |
| 5,519,606 A | 5/1996 | Frid-Nielsen et al. |
| 5,537,464 A | 7/1996 | Lewis et al. |
| 5,555,376 A | 9/1996 | Theimer et al. |
| 5,559,800 A | 9/1996 | Mousseau et al. |
| 5,572,571 A | 11/1996 | Shirai |
| 5,572,643 A | 11/1996 | Judson |
| 5,574,859 A | 11/1996 | Yeh |
| 5,581,749 A | 12/1996 | Hossain et al. |
| 5,600,834 A | 2/1997 | Howard |
| 5,603,054 A | 2/1997 | Theimer et al. |
| 5,604,788 A | 2/1997 | Tett |
| 5,613,012 A | 3/1997 | Hoffman et al. |
| 5,619,507 A | 4/1997 | Tsuda |
| 5,619,648 A | 4/1997 | Canale et al. |
| 5,623,601 A | 4/1997 | Vu |
| 5,625,670 A | 4/1997 | Campana, Jr. et al. |
| 5,625,815 A | 4/1997 | Maier et al. |
| 5,627,658 A | 5/1997 | Connors et al. |
| 5,630,081 A | 5/1997 | Rybicki et al. |
| 5,631,946 A | 5/1997 | Campana, Jr. et al. |
| 5,632,018 A | 5/1997 | Otorii |
| 5,634,053 A | 5/1997 | Noble et al. |
| 5,644,788 A | 7/1997 | Courtright et al. |
| 5,647,002 A | 7/1997 | Brunson |
| 5,652,884 A | 7/1997 | Palevich |
| 5,664,207 A | 9/1997 | Crumpler et al. |
| 5,666,530 A | 9/1997 | Clark et al. |
| 5,666,553 A | 9/1997 | Crozier |
| 5,673,322 A | 9/1997 | Pepe et al. |
| 5,680,542 A | 10/1997 | Mulchandani et al. |
| 5,682,524 A | 10/1997 | Freund et al. |
| 5,684,990 A | 11/1997 | Boothby |
| 5,689,654 A | 11/1997 | Kikinis et al. |
| 5,692,039 A | 11/1997 | Brankley et al. |
| 5,696,903 A | 12/1997 | Mahany |
| 5,701,423 A | 12/1997 | Crozier |
| 5,701,469 A | 12/1997 | Brandli et al. |
| 5,704,029 A | 12/1997 | Wright, Jr. |
| 5,706,211 A | 1/1998 | Beletic et al. |
| 5,706,502 A | 1/1998 | Foley et al. |
| 5,706,507 A | 1/1998 | Schloss |
| 5,710,918 A | 1/1998 | Lagarde et al. |
| 5,713,019 A | 1/1998 | Keaten |
| 5,715,403 A | 2/1998 | Stefik |
| 5,717,925 A | 2/1998 | Harper et al. |
| 5,721,908 A | 2/1998 | Lagarde et al. |
| 5,721,914 A | 2/1998 | DeVries |
| 5,727,202 A | 3/1998 | Kucala |
| 5,729,549 A | 3/1998 | Kostreski et al. |
| 5,729,704 A | 3/1998 | Stone et al. |
| 5,729,735 A | 3/1998 | Meyering |
| 5,742,905 A | 4/1998 | Pepe et al. |
| 5,745,360 A | 4/1998 | Leone et al. |
| 5,752,186 A | 5/1998 | Malackowski et al. |
| 5,752,246 A | 5/1998 | Rogers et al. |
| 5,754,938 A | 5/1998 | Herz et al. |
| 5,757,916 A | 5/1998 | MacDoran et al. |
| 5,758,088 A | 5/1998 | Bezaire et al. |
| 5,758,150 A | 5/1998 | Bell et al. |
| 5,758,322 A | 5/1998 | Rongley |
| 5,758,354 A | 5/1998 | Huang et al. |
| 5,758,355 A | 5/1998 | Buchanan |
| 5,765,171 A | 6/1998 | Gehani et al. |
| 5,778,346 A | 7/1998 | Frid-Nielsen et al. |
| 5,778,361 A | 7/1998 | Nanjo et al. |
| 5,781,614 A | 7/1998 | Brunson |
| 5,781,901 A | 7/1998 | Kuzma |
| 5,781,906 A | 7/1998 | Aggarwal et al. |
| 5,787,430 A | 7/1998 | Doeringer et al. |
| 5,787,441 A | 7/1998 | Beckhardt |
| 5,790,425 A | 8/1998 | Wagle |
| 5,790,790 A | 8/1998 | Smith et al. |
| 5,790,974 A | 8/1998 | Tognazzini |
| 5,793,413 A | 8/1998 | Hylton et al. |
| 5,794,210 A | 8/1998 | Goldhaber et al. |
| 5,799,318 A | 8/1998 | Cardinal et al. |
| 5,802,312 A | 9/1998 | Lazaridis et al. |
| 5,802,454 A | 9/1998 | Goshay et al. |
| 5,802,518 A | 9/1998 | Karaev et al. |
| 5,802,524 A | 9/1998 | Flowers et al. |
| 5,806,074 A | 9/1998 | Souder et al. |
| 5,809,242 A | 9/1998 | Shaw et al. |
| 5,809,415 A | 9/1998 | Rossmann |
| 5,818,437 A | 10/1998 | Grover et al. |
| 5,819,172 A | 10/1998 | Campana, Jr. et al. |
| 5,819,274 A | 10/1998 | Jackson, Jr. |
| 5,819,284 A | 10/1998 | Farber et al. |
| 5,822,324 A | 10/1998 | Kostresti et al. |
| 5,822,747 A | 10/1998 | Graefe et al. |
| 5,826,269 A | 10/1998 | Hussey |
| 5,831,664 A | 11/1998 | Wharton et al. |
| 5,832,483 A | 11/1998 | Barker |
| 5,832,489 A | 11/1998 | Kucala |
| 5,832,500 A | 11/1998 | Burrows |
| 5,835,087 A | 11/1998 | Herz et al. |
| 5,835,722 A | 11/1998 | Bradshaw et al. |
| 5,838,252 A | 11/1998 | Kikinis |
| 5,838,768 A | 11/1998 | Sumar et al. |
| 5,838,973 A | 11/1998 | Carpenter-Smith et al. |
| 5,845,278 A | 12/1998 | Kirsch et al. |
| 5,852,775 A | 12/1998 | Hidary |
| 5,852,820 A | 12/1998 | Burrows |
| 5,857,201 A | 1/1999 | Wright, Jr. et al. |
| 5,862,223 A | 1/1999 | Walker et al. |
| 5,867,665 A | 2/1999 | Butman et al. |
| 5,867,817 A | 2/1999 | Catallo et al. |
| 5,870,759 A | 2/1999 | Bauer et al. |
| 5,881,231 A | 3/1999 | Takagi et al. |
| 5,884,323 A | 3/1999 | Hawkins et al. |
| 5,889,845 A | 3/1999 | Staples et al. |
| 5,889,953 A | 3/1999 | Thebaut et al. |
| 5,890,147 A | 3/1999 | Peltonen et al. |
| 5,892,909 A | 4/1999 | Grasso et al. |
| 5,898,780 A | 4/1999 | Liu et al. |
| 5,898,917 A | 4/1999 | Batni et al. |
| 5,903,723 A | 5/1999 | Beck et al. |
| 5,907,618 A | 5/1999 | Gennaro et al. |
| 5,909,689 A | 6/1999 | Van Ryzin |
| 5,913,032 A | 6/1999 | Schwartz et al. |
| 5,924,096 A | 7/1999 | Draper et al. |
| 5,928,325 A | 7/1999 | Shaughnessy et al. |
| 5,928,329 A | 7/1999 | Clark et al. |
| 5,937,161 A | 8/1999 | Mulligan et al. |
| 5,940,813 A | 8/1999 | Hutchings |
| 5,943,676 A | 8/1999 | Boothby |
| 5,948,066 A | 9/1999 | Whalen et al. |
| 5,951,636 A | 9/1999 | Zerber |
| 5,960,394 A | 9/1999 | Gould et al. |
| 5,960,406 A | 9/1999 | Rasansky et al. |
| 5,961,590 A | 10/1999 | Mendez et al. |
| 5,963,642 A | 10/1999 | Goldstein |
| 5,964,833 A | 10/1999 | Kikinis |
| 5,968,131 A | 10/1999 | Mendez et al. |
| 5,974,238 A | 10/1999 | Chase, Jr. |
| 5,974,327 A | 10/1999 | Agrawal et al. |
| 5,978,837 A | 11/1999 | Foladare et al. |
| 5,978,933 A | 11/1999 | Wyld et al. |
| 5,987,440 A | 11/1999 | O'Neil et al. |
| 6,000,000 A | 12/1999 | Hawkins et al. |
| 6,003,070 A | 12/1999 | Frantz |
| 6,006,197 A | 12/1999 | d'Eon et al. |
| 6,006,274 A | 12/1999 | Hawkins et al. |
| 6,016,478 A | 1/2000 | Zhang et al. |
| 6,016,520 A | 1/2000 | Facq et al. |
| 6,018,762 A | 1/2000 | Brunson et al. |
| 6,023,700 A | 2/2000 | Owens et al. |
| 6,023,708 A | 2/2000 | Mendez et al. |
| 6,029,238 A | 2/2000 | Furukawa |
| 6,034,621 A | 3/2000 | Kaufman |
| 6,035,104 A | 3/2000 | Zahariev |

(56) References Cited

U.S. PATENT DOCUMENTS

| | | |
|---|---|---|
| 6,044,205 A | 3/2000 | Reed et al. |
| 6,044,372 A | 3/2000 | Rothfus et al. |
| 6,044,381 A | 3/2000 | Boothby et al. |
| 6,047,051 A | 4/2000 | Ginzboorg et al. |
| 6,047,327 A | 4/2000 | Tso et al. |
| 6,052,563 A | 4/2000 | Macko |
| 6,052,735 A | 4/2000 | Ulrich et al. |
| 6,057,855 A | 5/2000 | Barkans |
| 6,065,055 A | 5/2000 | Hughes et al. |
| 6,067,477 A | 5/2000 | Wewalaarachchi et al. |
| 6,073,138 A | 6/2000 | de l'Etraz et al. |
| 6,073,142 A | 6/2000 | Geiger et al. |
| 6,073,165 A | 6/2000 | Narasimhan et al. |
| 6,085,166 A | 7/2000 | Beckhardt et al. |
| 6,085,192 A | 7/2000 | Mendez et al. |
| 6,088,677 A | 7/2000 | Spurgeon |
| 6,098,172 A | 8/2000 | Coss et al. |
| 6,101,320 A | 8/2000 | Schuetze et al. |
| 6,101,480 A | 8/2000 | Conmy et al. |
| 6,101,531 A | 8/2000 | Eggleston et al. |
| 6,112,181 A | 8/2000 | Shear et al. |
| 6,118,771 A | 9/2000 | Tajika et al. |
| 6,119,014 A | 9/2000 | Alperovich et al. |
| 6,119,171 A | 9/2000 | Alkhatib |
| 6,125,369 A | 9/2000 | Wu et al. |
| 6,125,388 A | 9/2000 | Reisman |
| 6,125,441 A | 9/2000 | Green |
| 6,128,627 A | 10/2000 | Mattis et al. |
| 6,130,898 A | 10/2000 | Kostreski et al. |
| 6,131,096 A | 10/2000 | Ng et al. |
| 6,131,116 A | 10/2000 | Riggins et al. |
| 6,134,432 A | 10/2000 | Holmes et al. |
| 6,138,013 A | 10/2000 | Blanchard et al. |
| 6,138,124 A | 10/2000 | Beckhardt |
| 6,138,128 A | 10/2000 | Perkowitz et al. |
| 6,138,146 A | 10/2000 | Moon et al. |
| 6,141,664 A | 10/2000 | Boothby |
| 6,151,606 A | 11/2000 | Mendez |
| 6,157,630 A | 12/2000 | Adler et al. |
| 6,161,008 A | 12/2000 | Lee et al. |
| 6,161,140 A | 12/2000 | Moriya |
| 6,167,379 A | 12/2000 | Dean et al. |
| 6,167,435 A | 12/2000 | Druckenmiller et al. |
| 6,170,014 B1 | 1/2001 | Darago et al. |
| 6,173,312 B1 | 1/2001 | Atarashi et al. |
| 6,173,446 B1 | 1/2001 | Khan et al. |
| 6,175,831 B1 | 1/2001 | Weinreich et al. |
| 6,178,419 B1 | 1/2001 | Legh-Smith et al. |
| 6,181,935 B1 | 1/2001 | Gossman et al. |
| 6,185,184 B1 | 2/2001 | Mattaway et al. |
| 6,195,533 B1 | 2/2001 | Tkatch et al. |
| 6,198,696 B1 | 3/2001 | Korpi et al. |
| 6,198,922 B1 | 3/2001 | Baynham |
| 6,201,469 B1 | 3/2001 | Balch et al. |
| 6,202,085 B1 | 3/2001 | Benson et al. |
| 6,205,448 B1 | 3/2001 | Kruglikov et al. |
| 6,209,038 B1 | 3/2001 | Bowen et al. |
| 6,212,529 B1 | 4/2001 | Boothby et al. |
| 6,219,694 B1 | 4/2001 | Lazaridis et al. |
| 6,221,877 B1 | 4/2001 | Aronov et al. |
| 6,223,187 B1 | 4/2001 | Boothby et al. |
| 6,226,686 B1 | 5/2001 | Rothschild et al. |
| 6,233,341 B1 | 5/2001 | Riggins |
| 6,233,606 B1 | 5/2001 | Dujari |
| 6,243,705 B1 | 6/2001 | Kucala |
| 6,246,875 B1 | 6/2001 | Seazholtz et al. |
| 6,247,135 B1 | 6/2001 | Feague |
| 6,249,808 B1 | 6/2001 | Seshadri |
| 6,256,666 B1 | 7/2001 | Singhal |
| 6,263,201 B1 | 7/2001 | Hashimoto et al. |
| 6,263,340 B1 | 7/2001 | Green |
| 6,269,369 B1 | 7/2001 | Robertson |
| 6,272,545 B1 | 8/2001 | Flanagin et al. |
| 6,275,850 B1 | 8/2001 | Beyda et al. |
| 6,275,858 B1 | 8/2001 | Bates et al. |
| 6,289,212 B1 | 9/2001 | Stein et al. |
| 6,289,214 B1 | 9/2001 | Backstrom |
| 6,292,904 B1 | 9/2001 | Broomhall et al. |
| 6,295,541 B1 | 9/2001 | Bodnar et al. |
| 6,300,947 B1 | 10/2001 | Kanevsky |
| 6,304,881 B1 | 10/2001 | Halim et al. |
| 6,308,201 B1 | 10/2001 | Pivowar et al. |
| 6,311,216 B1 | 10/2001 | Smith et al. |
| 6,317,594 B1 | 11/2001 | Gossman et al. |
| 6,320,943 B1 | 11/2001 | Borland |
| 6,324,541 B1 | 11/2001 | de l'Etraz et al. |
| 6,324,542 B1 | 11/2001 | Wright, Jr. et al. |
| 6,324,544 B1 | 11/2001 | Alam et al. |
| 6,324,587 B1 | 11/2001 | Trenbeath et al. |
| 6,327,586 B1 | 12/2001 | Kisiel |
| 6,336,117 B1 | 1/2002 | Massarani |
| 6,336,138 B1 | 1/2002 | Caswell et al. |
| 6,341,311 B1 | 1/2002 | Smith et al. |
| 6,351,767 B1 | 2/2002 | Batchelder et al. |
| 6,356,937 B1 | 3/2002 | Montville et al. |
| 6,363,051 B1 | 3/2002 | Eslambolchi et al. |
| 6,363,352 B1 | 3/2002 | Dailey et al. |
| 6,370,566 B2 | 4/2002 | Discolo et al. |
| 6,377,790 B1 | 4/2002 | Ishii |
| 6,377,810 B1 | 4/2002 | Geiger et al. |
| 6,377,991 B1 | 4/2002 | Smith et al. |
| 6,380,959 B1 | 4/2002 | Wang et al. |
| 6,389,422 B1 | 5/2002 | Doi et al. |
| 6,389,455 B1 | 5/2002 | Fuisz |
| 6,389,457 B2 | 5/2002 | Lazaridis et al. |
| 6,397,057 B1 | 5/2002 | Malackowski et al. |
| 6,397,230 B1 | 5/2002 | Carmel et al. |
| 6,401,104 B1 | 6/2002 | LaRue et al. |
| 6,401,112 B1 | 6/2002 | Boyer et al. |
| 6,401,113 B2 | 6/2002 | Lazaridis et al. |
| 6,405,197 B2 | 6/2002 | Gilmour |
| 6,411,696 B1 | 6/2002 | Iverson et al. |
| 6,415,031 B1 | 7/2002 | Colligan et al. |
| 6,418,308 B1 | 7/2002 | Heinonen et al. |
| 6,421,669 B1 | 7/2002 | Gilmour et al. |
| 6,421,674 B1 | 7/2002 | Yoakum et al. |
| 6,421,781 B1 | 7/2002 | Fox et al. |
| 6,430,602 B1 | 8/2002 | Kay et al. |
| 6,438,585 B2 | 8/2002 | Mousseau et al. |
| 6,438,612 B1 | 8/2002 | Ylonen et al. |
| 6,442,589 B1 | 8/2002 | Takahashi et al. |
| 6,442,637 B1 | 8/2002 | Hawkins et al. |
| 6,446,118 B1 | 9/2002 | Gottlieb |
| 6,463,463 B1 | 10/2002 | Godfrey et al. |
| 6,463,464 B1 | 10/2002 | Lazaridis et al. |
| 6,484,203 B1 | 11/2002 | Porras et al. |
| 6,487,557 B1 | 11/2002 | Nagatomo |
| 6,487,560 B1 | 11/2002 | LaRue et al. |
| 6,490,353 B1 | 12/2002 | Tan |
| 6,496,802 B1 | 12/2002 | van Zoest et al. |
| 6,499,054 B1 | 12/2002 | Hesselink et al. |
| 6,505,214 B1 | 1/2003 | Sherman et al. |
| 6,516,327 B1 | 2/2003 | Zondervan et al. |
| 6,526,433 B1 | 2/2003 | Chang et al. |
| 6,526,506 B1 | 2/2003 | Lewis |
| 6,529,908 B1 | 3/2003 | Piett et al. |
| 6,532,446 B1 | 3/2003 | King |
| 6,535,892 B1 | 3/2003 | LaRue et al. |
| 6,546,005 B1 | 4/2003 | Berkley et al. |
| 6,549,939 B1 | 4/2003 | Ford et al. |
| 6,556,217 B1 | 4/2003 | Makipaa et al. |
| 6,557,026 B1 | 4/2003 | Stephens, Jr. |
| 6,571,140 B1 | 5/2003 | Wewalaarachchi et al. |
| 6,593,944 B1 | 7/2003 | Nicolas et al. |
| 6,601,026 B2 | 7/2003 | Appelt et al. |
| 6,615,253 B1 | 9/2003 | Bowman-Amuah |
| 6,618,710 B1 | 9/2003 | Zondervan et al. |
| 6,621,892 B1 | 9/2003 | Banister et al. |
| 6,622,157 B1 | 9/2003 | Heddaya et al. |
| 6,625,621 B2 | 9/2003 | Tan et al. |
| 6,636,482 B2 | 10/2003 | Cloonan et al. |
| 6,639,693 B1 | 10/2003 | Ejiri et al. |
| 6,640,097 B2 | 10/2003 | Corrigan et al. |
| 6,640,244 B1 | 10/2003 | Bowman-Amuah |

(56) References Cited

U.S. PATENT DOCUMENTS

| | | |
|---|---|---|
| 6,640,249 B1 | 10/2003 | Bowman-Amuah |
| 6,643,650 B1 | 11/2003 | Slaughter et al. |
| 6,643,688 B1 | 11/2003 | Fuisz |
| 6,647,384 B2 | 11/2003 | Gilmour |
| 6,650,890 B1 | 11/2003 | Irlam et al. |
| 6,662,016 B1 | 12/2003 | Buckham et al. |
| 6,668,046 B1 | 12/2003 | Albal |
| 6,671,695 B2 | 12/2003 | McFadden |
| 6,671,700 B1 | 12/2003 | Creemer et al. |
| 6,671,702 B2 | 12/2003 | Kruglikov et al. |
| 6,671,757 B1 | 12/2003 | Cash et al. |
| 6,694,336 B1 | 2/2004 | Multer et al. |
| 6,697,807 B2 | 2/2004 | McGeachie |
| 6,701,378 B1 | 3/2004 | Gilhuly et al. |
| 6,707,801 B2 | 3/2004 | Hsu |
| 6,708,221 B1 | 3/2004 | Mendez et al. |
| 6,714,965 B2 | 3/2004 | Kakuta et al. |
| 6,721,787 B1 | 4/2004 | Hiscock |
| 6,727,917 B1 | 4/2004 | Chew et al. |
| 6,728,530 B1 | 4/2004 | Heinonen et al. |
| 6,728,786 B2 | 4/2004 | Hawkins et al. |
| 6,732,101 B1 | 5/2004 | Cook |
| 6,732,158 B1 | 5/2004 | Hesselink et al. |
| 6,735,591 B2 | 5/2004 | Khan |
| 6,741,232 B1 | 5/2004 | Siedlikowski et al. |
| 6,741,855 B1 | 5/2004 | Martin et al. |
| 6,742,015 B1 | 5/2004 | Bowman-Amuah |
| 6,742,059 B1 | 5/2004 | Todd et al. |
| 6,745,024 B1 | 6/2004 | DeJaco et al. |
| 6,745,326 B1 | 6/2004 | Wary |
| 6,756,882 B2 | 6/2004 | Benes et al. |
| 6,757,362 B1 | 6/2004 | Cooper et al. |
| 6,757,696 B2 | 6/2004 | Multer et al. |
| 6,757,708 B1 | 6/2004 | Craig et al. |
| 6,760,916 B2 | 7/2004 | Holtz et al. |
| 6,771,294 B1 | 8/2004 | Pulli et al. |
| 6,775,362 B1 | 8/2004 | Ransom |
| 6,779,019 B1 | 8/2004 | Mousseau et al. |
| 6,782,409 B1 | 8/2004 | Yoshida |
| 6,785,868 B1 | 8/2004 | Raff |
| 6,785,906 B1 | 8/2004 | Gaughan et al. |
| 6,799,190 B1 | 9/2004 | Boothby |
| 6,804,707 B1 | 10/2004 | Ronning |
| 6,810,405 B1 | 10/2004 | LaRue et al. |
| 6,816,849 B1 | 11/2004 | Halt, Jr. |
| 6,820,088 B1 | 11/2004 | Hind et al. |
| 6,820,204 B1 | 11/2004 | Desai et al. |
| 6,829,487 B2 | 12/2004 | Eiden et al. |
| 6,834,195 B2 | 12/2004 | Brandenberg et al. |
| 6,845,383 B1 | 1/2005 | Kraenzel et al. |
| 6,847,974 B2 | 1/2005 | Wachtel |
| 6,850,757 B2 | 2/2005 | Watanabe et al. |
| 6,859,212 B2 | 2/2005 | Kumar et al. |
| 6,867,774 B1 | 3/2005 | Halmshaw et al. |
| 6,868,447 B1 | 3/2005 | Slaughter et al. |
| 6,871,220 B1 | 3/2005 | Rajan et al. |
| 6,871,236 B2 | 3/2005 | Fishman et al. |
| 6,873,688 B1 | 3/2005 | Aarnio |
| 6,874,017 B1 | 3/2005 | Inoue et al. |
| 6,879,985 B2 | 4/2005 | Deguchi et al. |
| 6,886,030 B1 | 4/2005 | Easterbrook et al. |
| 6,892,070 B2 | 5/2005 | Warrier et al. |
| 6,892,196 B1 | 5/2005 | Hughes |
| 6,895,394 B1 | 5/2005 | Kremer et al. |
| 6,895,558 B1 | 5/2005 | Loveland |
| 6,898,427 B1 | 5/2005 | Griffith et al. |
| 6,912,562 B1 | 6/2005 | Krishnamurthy et al. |
| 6,922,547 B2 | 7/2005 | O'Neill et al. |
| 6,922,721 B1 | 7/2005 | Minborg et al. |
| 6,925,477 B1 | 8/2005 | Champagne et al. |
| 6,931,529 B2 | 8/2005 | Kunzinger |
| 6,938,079 B1 | 8/2005 | Anderson et al. |
| 6,938,100 B2 | 8/2005 | Kang |
| 6,941,351 B2 | 9/2005 | Vetrivelkumaran et al. |
| 6,944,447 B2 | 9/2005 | Portman et al. |
| 6,944,662 B2 | 9/2005 | Devine et al. |
| 6,947,770 B2 | 9/2005 | Rydbeck |
| 6,954,754 B2 | 10/2005 | Peng |
| 6,957,397 B1 | 10/2005 | Hawkins et al. |
| 6,965,917 B1 | 11/2005 | Aloni et al. |
| 6,965,968 B1 | 11/2005 | Touboul |
| 6,966,058 B2 | 11/2005 | Earl et al. |
| 6,968,175 B2 | 11/2005 | Raivisto et al. |
| 6,970,879 B1 | 11/2005 | Gilmour |
| 6,972,682 B2 | 12/2005 | Lareau et al. |
| 6,973,299 B2 | 12/2005 | Apfel |
| 6,981,041 B2 | 12/2005 | Araujo et al. |
| 6,981,047 B2 | 12/2005 | Hanson et al. |
| 6,985,933 B1 | 1/2006 | Singhal et al. |
| 6,985,983 B2 | 1/2006 | Pellegrino et al. |
| 6,986,061 B1 | 1/2006 | Kunzinger |
| 6,987,734 B2 | 1/2006 | Hundemer |
| 6,990,472 B2 | 1/2006 | Rosenhaft et al. |
| 6,993,326 B2 | 1/2006 | Link et al. |
| 6,993,327 B2 | 1/2006 | Mathis |
| 6,996,627 B1 | 2/2006 | Carden |
| 6,999,753 B2 | 2/2006 | Beckmann et al. |
| 7,016,710 B2 | 3/2006 | Carmeli et al. |
| 7,020,685 B1 | 3/2006 | Chen et al. |
| 7,024,491 B1 | 4/2006 | Hanmann et al. |
| 7,026,984 B1 | 4/2006 | Thandu et al. |
| 7,032,242 B1 | 4/2006 | Grabelsky et al. |
| 7,035,630 B2 | 4/2006 | Knowles |
| 7,046,993 B2 | 5/2006 | Haaramo et al. |
| 7,047,202 B2 | 5/2006 | Jaipuria et al. |
| 7,062,024 B2 | 6/2006 | Kreckel et al. |
| 7,069,308 B2 | 6/2006 | Abrams |
| 7,072,678 B2 | 7/2006 | Allison |
| 7,079,499 B1 | 7/2006 | Akhtar et al. |
| 7,080,371 B1 | 7/2006 | Arnaiz et al. |
| 7,082,316 B2 | 7/2006 | Eiden et al. |
| 7,085,260 B2 | 8/2006 | Karaul et al. |
| 7,085,365 B2 | 8/2006 | Kauppinen |
| 7,096,030 B2 | 8/2006 | Huomo |
| 7,100,821 B2 | 9/2006 | Rasti |
| 7,103,432 B2 | 9/2006 | Drader et al. |
| 7,116,682 B1 | 10/2006 | Waclawsky et al. |
| 7,120,692 B2 | 10/2006 | Hesselink et al. |
| 7,120,928 B2 | 10/2006 | Sheth et al. |
| 7,124,320 B1 | 10/2006 | Wipfel |
| 7,127,492 B1 | 10/2006 | Calo et al. |
| 7,130,839 B2 | 10/2006 | Boreham et al. |
| 7,136,645 B2 | 11/2006 | Hanson et al. |
| 7,139,555 B2 | 11/2006 | Apfel |
| 7,139,565 B2 | 11/2006 | Fiatal et al. |
| 7,140,549 B2 | 11/2006 | de Jong |
| 7,146,645 B1 | 12/2006 | Hellsten et al. |
| 7,149,780 B2 | 12/2006 | Quine et al. |
| 7,149,789 B2 | 12/2006 | Slivka et al. |
| 7,149,959 B1 | 12/2006 | Jones et al. |
| 7,162,241 B2 | 1/2007 | Kim et al. |
| 7,165,727 B2 | 1/2007 | de Jong |
| 7,172,118 B2 | 2/2007 | Urken |
| 7,177,912 B1 | 2/2007 | Ignatoff et al. |
| 7,181,212 B2 | 2/2007 | Hogan et al. |
| 7,181,228 B2 | 2/2007 | Boesch |
| 7,184,790 B2 | 2/2007 | Dorenbosch et al. |
| 7,185,362 B2 | 2/2007 | Hawkes et al. |
| 7,194,273 B2 | 3/2007 | Vaudreuil |
| 7,200,390 B1 | 4/2007 | Henager et al. |
| 7,203,733 B1 | 4/2007 | Bern |
| 7,206,806 B2 | 4/2007 | Pineau |
| 7,209,757 B2 | 4/2007 | Naghian et al. |
| 7,210,121 B2 | 4/2007 | Xia et al. |
| 7,219,139 B2 | 5/2007 | Martin et al. |
| 7,219,222 B1 | 5/2007 | Durbin et al. |
| 7,224,957 B2 | 5/2007 | Spector |
| 7,231,206 B2 | 6/2007 | Cudak et al. |
| 7,233,795 B1 | 6/2007 | Ryden |
| 7,234,111 B2 | 6/2007 | Chu et al. |
| 7,239,877 B2 | 7/2007 | Corneille et al. |
| 7,240,095 B1 | 7/2007 | Lewis |
| 7,242,680 B2 | 7/2007 | Gallant |
| 7,245,926 B2 | 7/2007 | Liao et al. |

(56) References Cited

U.S. PATENT DOCUMENTS

| | | |
|---|---|---|
| 7,249,370 B2 | 7/2007 | Kodama et al. |
| 7,257,391 B2 | 8/2007 | Burgess et al. |
| 7,257,639 B1 | 8/2007 | Li et al. |
| 7,259,666 B1 | 8/2007 | Hermsmeyer et al. |
| 7,260,552 B2 | 8/2007 | Riera Jorba et al. |
| 7,260,590 B1 | 8/2007 | Williams |
| 7,260,651 B2 | 8/2007 | Parrella, Sr. et al. |
| 7,272,830 B2 | 9/2007 | de Jong |
| 7,274,783 B2 | 9/2007 | Yoakum et al. |
| 7,277,408 B2 | 10/2007 | Sorsa |
| 7,284,664 B1 | 10/2007 | Ivchenko et al. |
| 7,289,792 B1 | 10/2007 | Turunen |
| 7,289,964 B1 | 10/2007 | Bowman-Amuah |
| 7,289,971 B1 | 10/2007 | O'Neil et al. |
| 7,293,107 B1 | 11/2007 | Hanson et al. |
| 7,295,853 B2 | 11/2007 | Jin et al. |
| 7,296,155 B1 | 11/2007 | Trostle et al. |
| 7,305,252 B2 | 12/2007 | Britt et al. |
| 7,305,700 B2 | 12/2007 | Boynton et al. |
| 7,310,350 B1 | 12/2007 | Shao et al. |
| 7,310,729 B2 | 12/2007 | Gordon et al. |
| 7,324,473 B2 | 1/2008 | Corneille et al. |
| 7,337,219 B1 | 2/2008 | Meenan et al. |
| 7,343,396 B2 | 3/2008 | Kausik et al. |
| 7,349,871 B2 | 3/2008 | Labrou et al. |
| 7,353,258 B2 | 4/2008 | Washburn |
| 7,353,274 B1 | 4/2008 | Rouhi et al. |
| 7,359,720 B2 | 4/2008 | Hartmaier et al. |
| 7,373,386 B2 | 5/2008 | Gardner et al. |
| 7,373,661 B2 | 5/2008 | Smith et al. |
| 7,374,099 B2 | 5/2008 | de Jong |
| 7,376,701 B2 | 5/2008 | Bhargava et al. |
| 7,382,879 B1 | 6/2008 | Miller |
| 7,383,339 B1 | 6/2008 | Meenan et al. |
| 7,388,950 B2 | 6/2008 | Elsey et al. |
| 7,389,412 B2 | 6/2008 | Sharma et al. |
| 7,392,483 B2 | 6/2008 | Wong et al. |
| 7,395,329 B1 | 7/2008 | Holt et al. |
| 7,398,271 B1 | 7/2008 | Borkovsky et al. |
| 7,430,609 B2 | 9/2008 | Brown et al. |
| 7,441,271 B2 | 10/2008 | Fiatal et al. |
| 7,443,847 B1 | 10/2008 | Albert et al. |
| 7,461,071 B2 | 12/2008 | Fitzpatrick et al. |
| 7,465,231 B2 | 12/2008 | Lewin et al. |
| 7,469,125 B2 | 12/2008 | Nurmi |
| 7,472,424 B2 | 12/2008 | Evans et al. |
| 7,483,036 B2 | 1/2009 | Moore |
| 7,499,537 B2 | 3/2009 | Elsey et al. |
| 7,502,615 B2 | 3/2009 | Wilhoite et al. |
| 7,519,042 B2 | 4/2009 | Gorday et al. |
| 7,532,571 B1 | 5/2009 | Price et al. |
| 7,539,665 B2 | 5/2009 | Mendez |
| 7,548,947 B2 | 6/2009 | Karsriel et al. |
| 7,548,969 B2 | 6/2009 | Tripp et al. |
| 7,551,900 B2 | 6/2009 | Kang et al. |
| 7,555,291 B2 | 6/2009 | Wassingbo |
| 7,567,575 B2 | 7/2009 | Chen et al. |
| 7,574,208 B2 | 8/2009 | Hanson et al. |
| 7,575,171 B2 | 8/2009 | Lev |
| 7,584,294 B2 | 9/2009 | Plamondon |
| 7,587,482 B2 | 9/2009 | Henderson et al. |
| 7,587,510 B1 | 9/2009 | Klager et al. |
| 7,587,608 B2 | 9/2009 | Haller et al. |
| 7,589,223 B2 | 9/2009 | Bildstein et al. |
| 7,593,714 B2 | 9/2009 | Schultz et al. |
| 7,596,608 B2 | 9/2009 | Alexander et al. |
| 7,596,791 B2 | 9/2009 | Wei et al. |
| 7,613,792 B2 | 11/2009 | Zervas et al. |
| 7,630,986 B1 | 12/2009 | Herz et al. |
| 7,634,558 B1 | 12/2009 | Mangal et al. |
| 7,636,763 B1 | 12/2009 | Fein et al. |
| 7,643,818 B2 | 1/2010 | Backholm et al. |
| 7,644,166 B2 | 1/2010 | Appelman et al. |
| 7,647,047 B2 | 1/2010 | Moghaddam et al. |
| 7,647,561 B2 | 1/2010 | Zondervan et al. |
| 7,650,416 B2 | 1/2010 | Wu et al. |
| 7,650,432 B2 | 1/2010 | Bosworth et al. |
| 7,672,291 B2 | 3/2010 | Wang |
| 7,672,439 B2 | 3/2010 | Appelman et al. |
| 7,680,281 B2 | 3/2010 | Fiatal et al. |
| 7,680,520 B2 | 3/2010 | Ruuska et al. |
| 7,684,346 B2 | 3/2010 | Valli |
| 7,689,664 B2 | 3/2010 | Karlberg |
| 7,693,555 B2 | 4/2010 | Srinivasan et al. |
| 7,693,944 B2 | 4/2010 | Appelman et al. |
| 7,694,008 B2 | 4/2010 | Chang et al. |
| 7,706,781 B2 | 4/2010 | Backholm et al. |
| 7,707,573 B1 | 4/2010 | Marmaros et al. |
| 7,716,710 B1 | 5/2010 | Everson et al. |
| 7,751,803 B2 | 7/2010 | Vialen et al. |
| 7,752,633 B1 | 7/2010 | Fleming |
| 7,757,956 B2 | 7/2010 | Koenck et al. |
| 7,769,395 B2 | 8/2010 | Fiatal et al. |
| 7,769,400 B2 | 8/2010 | Backholm et al. |
| 7,769,805 B1 | 8/2010 | Barnes et al. |
| 7,770,223 B2 | 8/2010 | Shevenell et al. |
| 7,778,792 B2 | 8/2010 | Huang et al. |
| 7,783,757 B2 | 8/2010 | Plamondon |
| 7,796,742 B1 | 9/2010 | Sutaria et al. |
| 7,797,064 B2 | 9/2010 | Loomis et al. |
| 7,809,818 B2 | 10/2010 | Plamondon |
| 7,827,055 B1 | 11/2010 | Snodgrass et al. |
| 7,827,597 B2 | 11/2010 | Boynton et al. |
| 7,849,507 B1 | 12/2010 | Bloch et al. |
| 7,853,563 B2 | 12/2010 | Alvarado et al. |
| 7,865,618 B2 | 1/2011 | Howell et al. |
| 7,873,609 B2 | 1/2011 | Kim et al. |
| 7,873,705 B2 | 1/2011 | Kalish |
| 7,877,703 B1 | 1/2011 | Fleming |
| 7,877,807 B2 | 1/2011 | Shipp |
| 7,881,745 B1 | 2/2011 | Rao et al. |
| 7,899,996 B1 | 3/2011 | Levin-Michael |
| 7,904,548 B2 | 3/2011 | Shah et al. |
| 7,908,656 B1 | 3/2011 | Mu |
| 7,917,468 B2 | 3/2011 | Ariel et al. |
| 7,917,505 B2 | 3/2011 | van Gent et al. |
| 7,921,167 B2 | 4/2011 | Shroff et al. |
| 7,930,416 B2 | 4/2011 | Miller et al. |
| 7,933,929 B1 | 4/2011 | McClendon et al. |
| 7,937,091 B2 | 5/2011 | Roman et al. |
| 7,941,582 B2 | 5/2011 | Bushell et al. |
| 7,958,238 B1 | 6/2011 | Batz et al. |
| 7,970,860 B2 | 6/2011 | Kline et al. |
| 7,970,939 B1 | 6/2011 | Satish et al. |
| 7,996,487 B2 | 8/2011 | Snyder |
| 7,996,876 B1 | 8/2011 | Everson et al. |
| 8,005,891 B2 | 8/2011 | Knowles et al. |
| 8,010,082 B2 | 8/2011 | Sutaria et al. |
| 8,032,409 B1 | 10/2011 | Mikurak |
| 8,041,792 B2 | 10/2011 | Donaghey et al. |
| 8,056,136 B1 | 11/2011 | Zaitsev |
| 8,060,154 B1 | 11/2011 | Bali et al. |
| 8,064,583 B1 | 11/2011 | Sutaria et al. |
| 8,069,166 B2 | 11/2011 | Alvarado et al. |
| 8,074,162 B1 | 12/2011 | Cohen |
| 8,078,158 B2 | 12/2011 | Backholm |
| 8,087,085 B2 | 12/2011 | Hu et al. |
| 8,107,921 B2 | 1/2012 | Fiatal |
| 8,116,214 B2 | 2/2012 | Backholm et al. |
| 8,127,342 B2 | 2/2012 | Boynton et al. |
| 8,131,763 B2 | 3/2012 | Tuscano et al. |
| 8,160,062 B2 | 4/2012 | Qian et al. |
| 8,166,164 B1 | 4/2012 | Luna et al. |
| 8,190,680 B2 | 5/2012 | Spilo et al. |
| 8,190,701 B2 | 5/2012 | Luna et al. |
| 8,194,680 B1 | 6/2012 | Brandwine et al. |
| 8,195,196 B2 | 6/2012 | Haran et al. |
| 8,204,953 B2 | 6/2012 | Luna et al. |
| 8,209,709 B2 | 6/2012 | Fleming |
| 8,214,813 B2 | 7/2012 | Harris et al. |
| 8,239,915 B1 | 8/2012 | Satish et al. |
| 8,260,852 B1 | 9/2012 | Cselle |
| 8,291,076 B2 | 10/2012 | Luna et al. |
| 8,316,098 B2 | 11/2012 | Luna et al. |

(56) References Cited

U.S. PATENT DOCUMENTS

| | | |
|---|---|---|
| 8,326,985 B2 | 12/2012 | Luna et al. |
| 8,340,633 B1 | 12/2012 | Rege et al. |
| 8,356,080 B2 | 1/2013 | Luna et al. |
| 8,364,181 B2 | 1/2013 | Backholm et al. |
| 8,412,675 B2 | 4/2013 | Alvarado et al. |
| 8,417,823 B2 | 4/2013 | Luna et al. |
| 8,438,633 B1 | 5/2013 | Backholm et al. |
| 8,484,314 B2 | 7/2013 | Luna et al. |
| 8,522,086 B1 | 8/2013 | Garrett |
| 8,539,040 B2 | 9/2013 | Luna et al. |
| 8,606,290 B2 | 12/2013 | Gerber et al. |
| 8,621,075 B2 | 12/2013 | Luna |
| 8,635,339 B2 | 1/2014 | Luna |
| 8,700,728 B2 | 4/2014 | Luna et al. |
| 2001/0005364 A1 | 6/2001 | Kang |
| 2001/0009025 A1 | 7/2001 | Ahonen |
| 2001/0010046 A1 | 7/2001 | Muyres et al. |
| 2001/0013069 A1 | 8/2001 | Shah |
| 2001/0013088 A1 | 8/2001 | Matsumoto |
| 2001/0023414 A1 | 9/2001 | Kumar et al. |
| 2001/0032254 A1 | 10/2001 | Hawkins |
| 2001/0034225 A1 | 10/2001 | Gupte et al. |
| 2001/0034244 A1 | 10/2001 | Calder et al. |
| 2001/0037453 A1 | 11/2001 | Mitty et al. |
| 2001/0039191 A1 | 11/2001 | Maierhofer |
| 2001/0041566 A1 | 11/2001 | Xanthos et al. |
| 2001/0042009 A1 | 11/2001 | Montague |
| 2001/0042099 A1 | 11/2001 | Peng |
| 2001/0043148 A1 | 11/2001 | Stewart |
| 2001/0052052 A1 | 12/2001 | Peng |
| 2001/0053687 A1 | 12/2001 | Sivula |
| 2002/0002478 A1 | 1/2002 | Swart et al. |
| 2002/0002591 A1 | 1/2002 | Ketola |
| 2002/0004746 A1 | 1/2002 | Ferber et al. |
| 2002/0007303 A1 | 1/2002 | Brookler et al. |
| 2002/0013727 A1 | 1/2002 | Lee |
| 2002/0019225 A1 | 2/2002 | Miyashita |
| 2002/0019812 A1 | 2/2002 | Board et al. |
| 2002/0019830 A1 | 2/2002 | Hamberg et al. |
| 2002/0032671 A1 | 3/2002 | Iinuma |
| 2002/0035556 A1 | 3/2002 | Shah et al. |
| 2002/0035617 A1 | 3/2002 | Lynch et al. |
| 2002/0038253 A1 | 3/2002 | Seaman et al. |
| 2002/0042875 A1 | 4/2002 | Shukla |
| 2002/0049828 A1 | 4/2002 | Pekarek-Kostka |
| 2002/0049857 A1 | 4/2002 | Farber et al. |
| 2002/0052965 A1 | 5/2002 | Dowling |
| 2002/0053078 A1 | 5/2002 | Holtz et al. |
| 2002/0055351 A1 | 5/2002 | Elsey et al. |
| 2002/0059201 A1 | 5/2002 | Work |
| 2002/0059251 A1 | 5/2002 | Stern et al. |
| 2002/0059457 A1 | 5/2002 | Ballard et al. |
| 2002/0062467 A1 | 5/2002 | Hunzinger |
| 2002/0065110 A1 | 5/2002 | Enns et al. |
| 2002/0068559 A1 | 6/2002 | Sharma et al. |
| 2002/0069037 A1 | 6/2002 | Hendrickson et al. |
| 2002/0073207 A1 | 6/2002 | Widger et al. |
| 2002/0077077 A1 | 6/2002 | Rezvani et al. |
| 2002/0077084 A1 | 6/2002 | Zellner et al. |
| 2002/0078300 A1 | 6/2002 | Dharap |
| 2002/0078384 A1 | 6/2002 | Hippelainen |
| 2002/0087549 A1 | 7/2002 | Mostafa |
| 2002/0087679 A1 | 7/2002 | Pulley et al. |
| 2002/0087723 A1 | 7/2002 | Williams et al. |
| 2002/0087883 A1 | 7/2002 | Wohlgemuth et al. |
| 2002/0089542 A1 | 7/2002 | Imamura |
| 2002/0091921 A1 | 7/2002 | Kunzinger |
| 2002/0095319 A1 | 7/2002 | Swart et al. |
| 2002/0095328 A1 | 7/2002 | Swart et al. |
| 2002/0095391 A1 | 7/2002 | Swart et al. |
| 2002/0095399 A1 | 7/2002 | Devine et al. |
| 2002/0098855 A1 | 7/2002 | Hartmaier et al. |
| 2002/0099613 A1 | 7/2002 | Swart et al. |
| 2002/0099809 A1 | 7/2002 | Lee |
| 2002/0101975 A1 | 8/2002 | Tiburtius et al. |
| 2002/0103008 A1 | 8/2002 | Rahn et al. |
| 2002/0103934 A1 | 8/2002 | Fishman et al. |
| 2002/0107042 A1 | 8/2002 | Murnaghan et al. |
| 2002/0107944 A1 | 8/2002 | Bai et al. |
| 2002/0107985 A1 | 8/2002 | Hwang et al. |
| 2002/0108121 A1 | 8/2002 | Alao et al. |
| 2002/0116499 A1 | 8/2002 | Enns et al. |
| 2002/0116501 A1 | 8/2002 | Ho et al. |
| 2002/0120388 A1 | 8/2002 | Bullock |
| 2002/0120766 A1 | 8/2002 | Okajima et al. |
| 2002/0120779 A1* | 8/2002 | Teeple et al. ................ 709/246 |
| 2002/0126701 A1 | 9/2002 | Requena |
| 2002/0128908 A1 | 9/2002 | Levin et al. |
| 2002/0129088 A1 | 9/2002 | Zhou et al. |
| 2002/0133504 A1 | 9/2002 | Vlahos et al. |
| 2002/0138601 A1 | 9/2002 | Piponius et al. |
| 2002/0144109 A1 | 10/2002 | Benantar et al. |
| 2002/0146129 A1 | 10/2002 | Kaplan |
| 2002/0152379 A1 | 10/2002 | Gefwert et al. |
| 2002/0155848 A1* | 10/2002 | Suryanarayana ............ 455/466 |
| 2002/0156839 A1 | 10/2002 | Peterson et al. |
| 2002/0158908 A1 | 10/2002 | Vaajala et al. |
| 2002/0161587 A1 | 10/2002 | Pitts, III et al. |
| 2002/0161925 A1 | 10/2002 | Munger et al. |
| 2002/0161928 A1 | 10/2002 | Ndili |
| 2002/0164977 A1 | 11/2002 | Link, II et al. |
| 2002/0165988 A1 | 11/2002 | Khan et al. |
| 2002/0167484 A1 | 11/2002 | Hatanaka et al. |
| 2002/0174189 A1 | 11/2002 | Peng |
| 2002/0174208 A1 | 11/2002 | Morlitz |
| 2002/0186848 A1 | 12/2002 | Shaik |
| 2002/0188940 A1 | 12/2002 | Breckner et al. |
| 2002/0193094 A1 | 12/2002 | Lawless et al. |
| 2002/0194183 A1 | 12/2002 | Yoakum et al. |
| 2002/0194207 A1 | 12/2002 | Bartlett et al. |
| 2002/0194209 A1 | 12/2002 | Bolosky et al. |
| 2002/0198027 A1 | 12/2002 | Rydbeck |
| 2002/0198991 A1 | 12/2002 | Gopalakrishnan et al. |
| 2003/0005151 A1 | 1/2003 | Ullman et al. |
| 2003/0009571 A1 | 1/2003 | Bavadekar |
| 2003/0012147 A1 | 1/2003 | Buckman et al. |
| 2003/0014491 A1 | 1/2003 | Horvitz et al. |
| 2003/0021400 A1 | 1/2003 | Grandgent et al. |
| 2003/0022662 A1 | 1/2003 | Mittal |
| 2003/0023692 A1 | 1/2003 | Moroo |
| 2003/0023975 A1 | 1/2003 | Schrader et al. |
| 2003/0025599 A1 | 2/2003 | Monroe |
| 2003/0028430 A1 | 2/2003 | Zimmerman |
| 2003/0028441 A1 | 2/2003 | Barsness et al. |
| 2003/0037094 A1 | 2/2003 | Douceur et al. |
| 2003/0046433 A1 | 3/2003 | Luzzatti et al. |
| 2003/0046586 A1 | 3/2003 | Bheemarasetti et al. |
| 2003/0046587 A1 | 3/2003 | Bheemarasetti et al. |
| 2003/0050041 A1 | 3/2003 | Wu |
| 2003/0051142 A1 | 3/2003 | Hidalgo et al. |
| 2003/0054810 A1 | 3/2003 | Chen et al. |
| 2003/0055555 A1 | 3/2003 | Knockeart et al. |
| 2003/0056096 A1 | 3/2003 | Albert et al. |
| 2003/0060188 A1 | 3/2003 | Gidron et al. |
| 2003/0063120 A1 | 4/2003 | Wong et al. |
| 2003/0065738 A1 | 4/2003 | Yang et al. |
| 2003/0065739 A1 | 4/2003 | Shnier |
| 2003/0065802 A1 | 4/2003 | Vitikainen et al. |
| 2003/0069816 A1 | 4/2003 | Ung et al. |
| 2003/0070061 A1 | 4/2003 | Wong et al. |
| 2003/0072451 A1 | 4/2003 | Pimentel et al. |
| 2003/0078880 A1 | 4/2003 | Alley et al. |
| 2003/0084165 A1 | 5/2003 | Kjellberg et al. |
| 2003/0084291 A1 | 5/2003 | Yamamoto et al. |
| 2003/0084361 A1 | 5/2003 | Lawrence et al. |
| 2003/0088629 A1 | 5/2003 | Berkowitz et al. |
| 2003/0093341 A1 | 5/2003 | Millard et al. |
| 2003/0093691 A1 | 5/2003 | Simon et al. |
| 2003/0096608 A1 | 5/2003 | Mortensen et al. |
| 2003/0097381 A1 | 5/2003 | Detweiler et al. |
| 2003/0100321 A1 | 5/2003 | Rao et al. |
| 2003/0100326 A1 | 5/2003 | Grube et al. |
| 2003/0105837 A1 | 6/2003 | Kamen et al. |
| 2003/0117432 A1 | 6/2003 | Kautto-Kiovula et al. |

(56) References Cited

U.S. PATENT DOCUMENTS

| | | |
|---|---|---|
| 2003/0120685 A1 | 6/2003 | Duncombe et al. |
| 2003/0125023 A1 | 7/2003 | Fishler |
| 2003/0126216 A1 | 7/2003 | Avila et al. |
| 2003/0126233 A1 | 7/2003 | Bryers et al. |
| 2003/0130984 A1 | 7/2003 | Quinlan et al. |
| 2003/0145038 A1 | 7/2003 | Bin Tariq et al. |
| 2003/0146934 A1 | 8/2003 | Bailey et al. |
| 2003/0153338 A1 | 8/2003 | Herz et al. |
| 2003/0154212 A1 | 8/2003 | Schirmer et al. |
| 2003/0156146 A1 | 8/2003 | Suomela et al. |
| 2003/0157947 A1 | 8/2003 | Fiatal et al. |
| 2003/0169262 A1 | 9/2003 | Lavelle et al. |
| 2003/0172112 A1 | 9/2003 | Vignaud |
| 2003/0177281 A1 | 9/2003 | McQuillan et al. |
| 2003/0182420 A1 | 9/2003 | Jones et al. |
| 2003/0182431 A1 | 9/2003 | Sturniolo et al. |
| 2003/0182441 A1 | 9/2003 | Andrew et al. |
| 2003/0187984 A1 | 10/2003 | Banavar et al. |
| 2003/0204605 A1 | 10/2003 | Hudson et al. |
| 2003/0204708 A1 | 10/2003 | Hulme et al. |
| 2003/0208529 A1 | 11/2003 | Pendyala et al. |
| 2003/0208559 A1 | 11/2003 | Velline et al. |
| 2003/0210666 A1 | 11/2003 | Trossen et al. |
| 2003/0211845 A1 | 11/2003 | Lohtia et al. |
| 2003/0217098 A1 | 11/2003 | Bobde et al. |
| 2003/0217142 A1 | 11/2003 | Bobde et al. |
| 2003/0223554 A1 | 12/2003 | Zhang |
| 2003/0227487 A1 | 12/2003 | Hugh |
| 2003/0227745 A1 | 12/2003 | Khoo |
| 2003/0229549 A1 | 12/2003 | Wolinsky et al. |
| 2003/0233329 A1 | 12/2003 | Laraki et al. |
| 2003/0235308 A1 | 12/2003 | Boynton et al. |
| 2003/0236857 A1 | 12/2003 | Takase et al. |
| 2003/0236981 A1 | 12/2003 | Marmigere et al. |
| 2004/0002324 A1 | 1/2004 | Juntunen et al. |
| 2004/0006630 A1 | 1/2004 | Friend et al. |
| 2004/0010590 A1 | 1/2004 | Manzano |
| 2004/0015504 A1 | 1/2004 | Ahad et al. |
| 2004/0024795 A1 | 2/2004 | Hind et al. |
| 2004/0024892 A1 | 2/2004 | Creswell et al. |
| 2004/0027326 A1 | 2/2004 | Hays et al. |
| 2004/0027375 A1 | 2/2004 | Ellis et al. |
| 2004/0027378 A1 | 2/2004 | Hays et al. |
| 2004/0030620 A1 | 2/2004 | Benjamin et al. |
| 2004/0030749 A1 | 2/2004 | Bowman-Amuah |
| 2004/0043770 A1 | 3/2004 | Amit et al. |
| 2004/0047356 A1 | 3/2004 | Bauer |
| 2004/0049579 A1 | 3/2004 | Ims et al. |
| 2004/0049599 A1 | 3/2004 | Friend et al. |
| 2004/0051715 A1 | 3/2004 | Brokenshire et al. |
| 2004/0054711 A1 | 3/2004 | Multer |
| 2004/0054739 A1 | 3/2004 | Friend et al. |
| 2004/0054854 A1 | 3/2004 | Thiyagaranjan et al. |
| 2004/0064445 A1 | 4/2004 | Pfleging et al. |
| 2004/0064488 A1 | 4/2004 | Sinha |
| 2004/0068579 A1 | 4/2004 | Marmigere et al. |
| 2004/0068698 A1 | 4/2004 | Wu et al. |
| 2004/0071146 A1 | 4/2004 | Belling |
| 2004/0072559 A1 | 4/2004 | Kakumaru et al. |
| 2004/0073476 A1 | 4/2004 | Donahue et al. |
| 2004/0073651 A1 | 4/2004 | Beaulieu et al. |
| 2004/0073707 A1 | 4/2004 | Dillon |
| 2004/0073867 A1 | 4/2004 | Kausik et al. |
| 2004/0075675 A1 | 4/2004 | Raivisto et al. |
| 2004/0075695 A1 | 4/2004 | Chew et al. |
| 2004/0078814 A1 | 4/2004 | Allen |
| 2004/0080515 A1 | 4/2004 | Hagiwara |
| 2004/0081088 A1 | 4/2004 | Schinner et al. |
| 2004/0082346 A1 | 4/2004 | Skytt et al. |
| 2004/0085909 A1 | 5/2004 | Soliman |
| 2004/0085980 A1 | 5/2004 | Lee |
| 2004/0098625 A1 | 5/2004 | Lagadec et al. |
| 2004/0103147 A1 | 5/2004 | Flesher et al. |
| 2004/0107319 A1 | 6/2004 | D'Orto et al. |
| 2004/0110497 A1 | 6/2004 | Little |
| 2004/0120262 A1 | 6/2004 | Hirose et al. |
| 2004/0120323 A1 | 6/2004 | Viikari et al. |
| 2004/0122907 A1 | 6/2004 | Chou et al. |
| 2004/0123095 A1 | 6/2004 | Marshall |
| 2004/0123304 A1 | 6/2004 | Black et al. |
| 2004/0127214 A1 | 7/2004 | Reddy et al. |
| 2004/0128375 A1 | 7/2004 | Rockwell |
| 2004/0133626 A1 | 7/2004 | Herrero et al. |
| 2004/0138931 A1 | 7/2004 | Hope et al. |
| 2004/0141011 A1 | 7/2004 | Smethers et al. |
| 2004/0147223 A1 | 7/2004 | Cho |
| 2004/0147248 A1 | 7/2004 | Will |
| 2004/0147262 A1 | 7/2004 | Lescuyer et al. |
| 2004/0148375 A1 | 7/2004 | Levett et al. |
| 2004/0151186 A1 | 8/2004 | Akama |
| 2004/0152450 A1 | 8/2004 | Kouznetsov et al. |
| 2004/0153537 A1 | 8/2004 | Rezvani et al. |
| 2004/0158611 A1 | 8/2004 | Daniell et al. |
| 2004/0162890 A1 | 8/2004 | Ohta |
| 2004/0167966 A1 | 8/2004 | Lee et al. |
| 2004/0170257 A1 | 9/2004 | Gross et al. |
| 2004/0172481 A1 | 9/2004 | Engstrom |
| 2004/0176128 A1 | 9/2004 | Grabelsky et al. |
| 2004/0177369 A1 | 9/2004 | Akins |
| 2004/0179513 A1 | 9/2004 | Smith et al. |
| 2004/0181550 A1 | 9/2004 | Warsta et al. |
| 2004/0184475 A1 | 9/2004 | Meier |
| 2004/0186889 A1 | 9/2004 | Washburn |
| 2004/0186902 A1 | 9/2004 | Stewart |
| 2004/0189610 A1 | 9/2004 | Friend |
| 2004/0198344 A1 | 10/2004 | Pitt et al. |
| 2004/0199497 A1 | 10/2004 | Timmons |
| 2004/0199582 A1 | 10/2004 | Kucharewski et al. |
| 2004/0199649 A1 | 10/2004 | Tarnanen et al. |
| 2004/0199663 A1 | 10/2004 | Horvitz et al. |
| 2004/0204085 A1 | 10/2004 | Vargas et al. |
| 2004/0205248 A1 | 10/2004 | Little et al. |
| 2004/0205330 A1 | 10/2004 | Godfrey et al. |
| 2004/0209602 A1 | 10/2004 | Joyce et al. |
| 2004/0210639 A1 | 10/2004 | Ben-Yoseph et al. |
| 2004/0218609 A1 | 11/2004 | Foster et al. |
| 2004/0219940 A1 | 11/2004 | Kong et al. |
| 2004/0229609 A1 | 11/2004 | Yamaguchi |
| 2004/0230619 A1 | 11/2004 | Blanco et al. |
| 2004/0230739 A1 | 11/2004 | Tsern et al. |
| 2004/0233930 A1 | 11/2004 | Colby, Jr. |
| 2004/0236792 A1 | 11/2004 | Celik |
| 2004/0242209 A1 | 12/2004 | Kruis et al. |
| 2004/0252816 A1 | 12/2004 | Nicolas |
| 2004/0255126 A1 | 12/2004 | Reith |
| 2004/0258231 A1 | 12/2004 | Elsey et al. |
| 2004/0259535 A1 | 12/2004 | Elsey et al. |
| 2004/0259537 A1 | 12/2004 | Ackley |
| 2004/0260948 A1 | 12/2004 | Miyata et al. |
| 2004/0264396 A1 | 12/2004 | Ginzburg et al. |
| 2004/0266364 A1 | 12/2004 | Nguyen et al. |
| 2004/0268148 A1 | 12/2004 | Karjala et al. |
| 2005/0002501 A1 | 1/2005 | Elsey et al. |
| 2005/0002508 A1 | 1/2005 | Elsey et al. |
| 2005/0002509 A1 | 1/2005 | Elsey et al. |
| 2005/0002510 A1 | 1/2005 | Elsey et al. |
| 2005/0010694 A1 | 1/2005 | Ma et al. |
| 2005/0015432 A1 | 1/2005 | Cohen |
| 2005/0021750 A1 | 1/2005 | Abrams |
| 2005/0022000 A1 | 1/2005 | Inomata et al. |
| 2005/0022182 A1 | 1/2005 | Mittal |
| 2005/0027591 A9 | 2/2005 | Gailey et al. |
| 2005/0027716 A1 | 2/2005 | Apfel |
| 2005/0027869 A1 | 2/2005 | Johnson |
| 2005/0030913 A1 | 2/2005 | Roy |
| 2005/0033657 A1 | 2/2005 | Herrington et al. |
| 2005/0033812 A1 | 2/2005 | McCarthy et al. |
| 2005/0033926 A1 | 2/2005 | Dumont |
| 2005/0037741 A1 | 2/2005 | Gilbert |
| 2005/0038707 A1 | 2/2005 | Roever et al. |
| 2005/0038724 A1 | 2/2005 | Roever et al. |
| 2005/0038863 A1 | 2/2005 | Onyon et al. |
| 2005/0041584 A1 | 2/2005 | Lau et al. |
| 2005/0041793 A1 | 2/2005 | Fulton et al. |

(56) References Cited

U.S. PATENT DOCUMENTS

| | | |
|---|---|---|
| 2005/0044144 A1 | 2/2005 | Malik et al. |
| 2005/0044235 A1 | 2/2005 | Balahura et al. |
| 2005/0050222 A1 | 3/2005 | Packer |
| 2005/0054381 A1 | 3/2005 | Lee et al. |
| 2005/0055578 A1 | 3/2005 | Wright et al. |
| 2005/0063544 A1 | 3/2005 | Uusitalo et al. |
| 2005/0071489 A1 | 3/2005 | Parupudi et al. |
| 2005/0071511 A1 | 3/2005 | Chen |
| 2005/0071674 A1 | 3/2005 | Chou et al. |
| 2005/0073982 A1 | 4/2005 | Corneille et al. |
| 2005/0075109 A1 | 4/2005 | Neyret et al. |
| 2005/0076085 A1 | 4/2005 | Budd et al. |
| 2005/0076136 A1 | 4/2005 | Cho et al. |
| 2005/0076241 A1 | 4/2005 | Appelman |
| 2005/0080928 A1 | 4/2005 | Beverly et al. |
| 2005/0086385 A1 | 4/2005 | Rouleau |
| 2005/0086540 A1 | 4/2005 | Gunter et al. |
| 2005/0094625 A1 | 5/2005 | Bouat |
| 2005/0097225 A1 | 5/2005 | Glatt et al. |
| 2005/0097570 A1 | 5/2005 | Bomers |
| 2005/0099963 A1 | 5/2005 | Multer et al. |
| 2005/0101307 A1 | 5/2005 | Brugge et al. |
| 2005/0102257 A1 | 5/2005 | Onyon et al. |
| 2005/0102328 A1 | 5/2005 | Ring et al. |
| 2005/0102351 A1 | 5/2005 | Jiang et al. |
| 2005/0108322 A1 | 5/2005 | Kline et al. |
| 2005/0108427 A1 | 5/2005 | Datta |
| 2005/0117606 A1 | 6/2005 | Kim |
| 2005/0120082 A1 | 6/2005 | Hesselink et al. |
| 2005/0120084 A1 | 6/2005 | Hu et al. |
| 2005/0120181 A1 | 6/2005 | Arunagirinathan et al. |
| 2005/0122333 A1 | 6/2005 | Sumanaweera et al. |
| 2005/0124332 A1 | 6/2005 | Clark et al. |
| 2005/0125459 A1 | 6/2005 | Sutinen et al. |
| 2005/0138111 A1 | 6/2005 | Aton et al. |
| 2005/0138176 A1 | 6/2005 | Singh et al. |
| 2005/0138198 A1 | 6/2005 | May |
| 2005/0144219 A1 | 6/2005 | Terada |
| 2005/0147130 A1 | 7/2005 | Hurwitz et al. |
| 2005/0154698 A1 | 7/2005 | Ikezawa et al. |
| 2005/0154796 A1 | 7/2005 | Forsyth |
| 2005/0154836 A1 | 7/2005 | Steely et al. |
| 2005/0155027 A1 | 7/2005 | Wei |
| 2005/0163048 A1 | 7/2005 | Arora et al. |
| 2005/0164703 A1 | 7/2005 | Huynh |
| 2005/0164721 A1 | 7/2005 | Eric Yeh et al. |
| 2005/0165909 A1 | 7/2005 | Cromer et al. |
| 2005/0170776 A1 | 8/2005 | Siorpaes |
| 2005/0183143 A1 | 8/2005 | Anderholm et al. |
| 2005/0188038 A1 | 8/2005 | Yabe |
| 2005/0188048 A1 | 8/2005 | Yuan et al. |
| 2005/0193036 A1 | 9/2005 | Phillips et al. |
| 2005/0193096 A1 | 9/2005 | Yu et al. |
| 2005/0198170 A1 | 9/2005 | LeMay et al. |
| 2005/0203966 A1 | 9/2005 | Labrou et al. |
| 2005/0210104 A1 | 9/2005 | Torvinen |
| 2005/0210125 A1 | 9/2005 | Li |
| 2005/0210150 A1 | 9/2005 | Bahl |
| 2005/0213511 A1 | 9/2005 | Reece et al. |
| 2005/0216295 A1 | 9/2005 | Abrahamsohn |
| 2005/0216844 A1 | 9/2005 | Error et al. |
| 2005/0222891 A1 | 10/2005 | Chan et al. |
| 2005/0228812 A1 | 10/2005 | Hansmann et al. |
| 2005/0232295 A1 | 10/2005 | Young |
| 2005/0234860 A1 | 10/2005 | Roever et al. |
| 2005/0235214 A1 | 10/2005 | Shimizu et al. |
| 2005/0245241 A1 | 11/2005 | Durand et al. |
| 2005/0246139 A1 | 11/2005 | Rivenbark et al. |
| 2005/0248526 A1 | 11/2005 | Twerdahl et al. |
| 2005/0250452 A1 | 11/2005 | Walton et al. |
| 2005/0251555 A1 | 11/2005 | Little |
| 2005/0254443 A1 | 11/2005 | Campbell et al. |
| 2005/0256880 A1 | 11/2005 | Nam Koong et al. |
| 2005/0262220 A1 | 11/2005 | Ecklund |
| 2005/0273804 A1 | 12/2005 | Preisman |
| 2005/0278307 A1 | 12/2005 | Battagin et al. |
| 2005/0278641 A1 | 12/2005 | Mansour et al. |
| 2005/0278647 A1 | 12/2005 | Leavitt et al. |
| 2005/0288006 A1 | 12/2005 | Apfel |
| 2006/0012672 A1 | 1/2006 | Schrader et al. |
| 2006/0020525 A1 | 1/2006 | Borelli et al. |
| 2006/0020580 A1 | 1/2006 | Dettinger et al. |
| 2006/0020715 A1 | 1/2006 | Jungck |
| 2006/0020804 A1 | 1/2006 | Schleifer et al. |
| 2006/0020947 A1 | 1/2006 | Hallamaa et al. |
| 2006/0021023 A1 | 1/2006 | Stewart et al. |
| 2006/0022048 A1 | 2/2006 | Johnson |
| 2006/0025169 A1 | 2/2006 | Maciocco et al. |
| 2006/0026580 A1 | 2/2006 | Cabillic et al. |
| 2006/0029062 A1 | 2/2006 | Rao et al. |
| 2006/0029063 A1 | 2/2006 | Rao et al. |
| 2006/0029064 A1 | 2/2006 | Rao et al. |
| 2006/0031114 A1 | 2/2006 | Zommers |
| 2006/0031300 A1 | 2/2006 | Kock et al. |
| 2006/0031365 A1 | 2/2006 | Kay et al. |
| 2006/0031428 A1 | 2/2006 | Wikman |
| 2006/0031522 A1 | 2/2006 | Soulhi et al. |
| 2006/0031785 A1 | 2/2006 | Raciborski |
| 2006/0031938 A1 | 2/2006 | Choi |
| 2006/0037071 A1 | 2/2006 | Rao et al. |
| 2006/0041717 A1 | 2/2006 | Rosker et al. |
| 2006/0045121 A1 | 3/2006 | Monk |
| 2006/0046686 A1* | 3/2006 | Hawkins et al. ............... 455/403 |
| 2006/0047844 A1 | 3/2006 | Deng |
| 2006/0048061 A1 | 3/2006 | Forlenza et al. |
| 2006/0052091 A1 | 3/2006 | Onyon et al. |
| 2006/0052137 A1 | 3/2006 | Randall et al. |
| 2006/0059495 A1 | 3/2006 | Spector |
| 2006/0063544 A1 | 3/2006 | Zhao et al. |
| 2006/0065716 A1 | 3/2006 | Peters |
| 2006/0069686 A1 | 3/2006 | Beyda et al. |
| 2006/0069687 A1 | 3/2006 | Cui et al. |
| 2006/0069715 A1 | 3/2006 | Vayssiere |
| 2006/0069742 A1 | 3/2006 | Segre |
| 2006/0069746 A1 | 3/2006 | Davis et al. |
| 2006/0073810 A1 | 4/2006 | Pyhalammi et al. |
| 2006/0074951 A1 | 4/2006 | Beier et al. |
| 2006/0075028 A1 | 4/2006 | Zager et al. |
| 2006/0084410 A1 | 4/2006 | Sutaria et al. |
| 2006/0085503 A1 | 4/2006 | Stoye et al. |
| 2006/0093026 A1 | 5/2006 | Montojo et al. |
| 2006/0093135 A1 | 5/2006 | Fiatal et al. |
| 2006/0099969 A1 | 5/2006 | Staton et al. |
| 2006/0099970 A1 | 5/2006 | Morgan et al. |
| 2006/0112177 A1 | 5/2006 | Barkley et al. |
| 2006/0122976 A1 | 6/2006 | Baluja et al. |
| 2006/0123042 A1 | 6/2006 | Xie et al. |
| 2006/0129766 A1 | 6/2006 | Cassia et al. |
| 2006/0132495 A1 | 6/2006 | Anderson |
| 2006/0141962 A1 | 6/2006 | Forbes et al. |
| 2006/0142018 A1 | 6/2006 | Matz et al. |
| 2006/0143464 A1 | 6/2006 | Ananthanarayanan et al. |
| 2006/0143692 A1 | 6/2006 | Kodama et al. |
| 2006/0149591 A1 | 7/2006 | Hanf et al. |
| 2006/0149843 A1 | 7/2006 | Rhoads et al. |
| 2006/0149970 A1 | 7/2006 | Imazu |
| 2006/0155822 A1 | 7/2006 | Yang et al. |
| 2006/0161621 A1 | 7/2006 | Rosenberg |
| 2006/0165226 A1 | 7/2006 | Ernst et al. |
| 2006/0166663 A1 | 7/2006 | Haehnichen et al. |
| 2006/0167969 A1 | 7/2006 | Andreev et al. |
| 2006/0168043 A1 | 7/2006 | Eisenberger et al. |
| 2006/0168164 A1 | 7/2006 | Lemson et al. |
| 2006/0179410 A1 | 8/2006 | Deeds |
| 2006/0182025 A1 | 8/2006 | Kim et al. |
| 2006/0184591 A1 | 8/2006 | Backholm et al. |
| 2006/0184613 A1 | 8/2006 | Stienessen et al. |
| 2006/0188864 A1* | 8/2006 | Shah ............................. 434/350 |
| 2006/0190428 A1 | 8/2006 | Jung et al. |
| 2006/0190569 A1 | 8/2006 | Neil et al. |
| 2006/0190984 A1 | 8/2006 | Heard et al. |
| 2006/0192014 A1 | 8/2006 | Hamilton et al. |
| 2006/0195570 A1 | 8/2006 | Zellner et al. |
| 2006/0203765 A1 | 9/2006 | Laroia et al. |

(56) References Cited

U.S. PATENT DOCUMENTS

| | | |
|---|---|---|
| 2006/0209842 A1 | 9/2006 | Creamer et al. |
| 2006/0212531 A1 | 9/2006 | Kikkawa et al. |
| 2006/0224629 A1 | 10/2006 | Alexander et al. |
| 2006/0230058 A1 | 10/2006 | Morris |
| 2006/0230394 A1 | 10/2006 | Forth et al. |
| 2006/0234630 A1 | 10/2006 | Lai |
| 2006/0236392 A1 | 10/2006 | Thomas et al. |
| 2006/0240804 A1 | 10/2006 | Backholm et al. |
| 2006/0240805 A1 | 10/2006 | Backholm et al. |
| 2006/0242137 A1 | 10/2006 | Shah et al. |
| 2006/0242210 A1 | 10/2006 | Ring et al. |
| 2006/0242320 A1 | 10/2006 | Nettle et al. |
| 2006/0242607 A1 | 10/2006 | Hudson |
| 2006/0252435 A1 | 11/2006 | Henderson et al. |
| 2006/0253456 A1 | 11/2006 | Pacholec et al. |
| 2006/0253575 A1 | 11/2006 | Carter et al. |
| 2006/0253605 A1 | 11/2006 | Sundarrajan et al. |
| 2006/0259517 A1 | 11/2006 | Urscheler et al. |
| 2006/0259923 A1 | 11/2006 | Chiu |
| 2006/0265595 A1 | 11/2006 | Scottodiluzio |
| 2006/0271884 A1 | 11/2006 | Hurst |
| 2006/0274701 A1 | 12/2006 | Albertsson |
| 2006/0277265 A1 | 12/2006 | Backholm et al. |
| 2006/0277271 A1 | 12/2006 | Morse et al. |
| 2006/0282408 A1 | 12/2006 | Wisely et al. |
| 2006/0294071 A1 | 12/2006 | Weare et al. |
| 2006/0294223 A1 | 12/2006 | Glasgow et al. |
| 2006/0294388 A1 | 12/2006 | Abraham et al. |
| 2007/0002897 A1 | 1/2007 | Goshen et al. |
| 2007/0005738 A1 | 1/2007 | Alexion-Tiernan et al. |
| 2007/0006317 A1 | 1/2007 | Asami et al. |
| 2007/0011367 A1 | 1/2007 | Scott et al. |
| 2007/0019610 A1 | 1/2007 | Backholm et al. |
| 2007/0021065 A1 | 1/2007 | Sengupta et al. |
| 2007/0022118 A1 | 1/2007 | Layne |
| 2007/0027775 A1 | 2/2007 | Hwang |
| 2007/0027832 A1 | 2/2007 | Fiatal et al. |
| 2007/0027886 A1 | 2/2007 | Gent et al. |
| 2007/0027917 A1 | 2/2007 | Ariel et al. |
| 2007/0027920 A1 | 2/2007 | Alvarado et al. |
| 2007/0027921 A1 | 2/2007 | Alvarado et al. |
| 2007/0027930 A1 | 2/2007 | Alvarado et al. |
| 2007/0033531 A1 | 2/2007 | Marsh |
| 2007/0038567 A1 | 2/2007 | Allaire et al. |
| 2007/0038931 A1 | 2/2007 | Allaire et al. |
| 2007/0039049 A1 | 2/2007 | Kupferman et al. |
| 2007/0041393 A1 | 2/2007 | Westhead et al. |
| 2007/0044041 A1 | 2/2007 | Beynon et al. |
| 2007/0049258 A1 | 3/2007 | Thibeault |
| 2007/0050591 A1 | 3/2007 | Boyd et al. |
| 2007/0053345 A1 | 3/2007 | Hsu et al. |
| 2007/0060196 A1 | 3/2007 | Sharma |
| 2007/0061393 A1 | 3/2007 | Moore |
| 2007/0067147 A1 | 3/2007 | Huang |
| 2007/0067381 A1 | 3/2007 | Grant et al. |
| 2007/0067424 A1 | 3/2007 | Raciborski et al. |
| 2007/0070931 A1 | 3/2007 | Lewis et al. |
| 2007/0072617 A1 | 3/2007 | Lewis et al. |
| 2007/0076264 A1 | 4/2007 | Pierce et al. |
| 2007/0077949 A1 | 4/2007 | Henderson et al. |
| 2007/0078857 A1 | 4/2007 | Punaganti et al. |
| 2007/0078964 A1 | 4/2007 | East et al. |
| 2007/0083600 A1 | 4/2007 | Bakos et al. |
| 2007/0088801 A1 | 4/2007 | Levkovitz et al. |
| 2007/0088852 A1 | 4/2007 | Levkovitz |
| 2007/0100650 A1 | 5/2007 | Ramer et al. |
| 2007/0101061 A1 | 5/2007 | Baskaran et al. |
| 2007/0105627 A1 | 5/2007 | Campbell |
| 2007/0106852 A1 | 5/2007 | Lam et al. |
| 2007/0111764 A1 | 5/2007 | Park et al. |
| 2007/0116223 A1 | 5/2007 | Burke et al. |
| 2007/0118620 A1 | 5/2007 | Cartmell et al. |
| 2007/0118669 A1 | 5/2007 | Rand et al. |
| 2007/0123214 A1 | 5/2007 | Mock |
| 2007/0130108 A1 | 6/2007 | Simpson et al. |
| 2007/0130217 A1 | 6/2007 | Linyard et al. |
| 2007/0136533 A1 | 6/2007 | Church et al. |
| 2007/0140193 A1 | 6/2007 | Dosa et al. |
| 2007/0147317 A1 | 6/2007 | Smith et al. |
| 2007/0147411 A1 | 6/2007 | Bijwaard et al. |
| 2007/0150599 A1 | 6/2007 | Neogi et al. |
| 2007/0150881 A1 | 6/2007 | Khawand et al. |
| 2007/0153798 A1 | 7/2007 | Krstulich |
| 2007/0156824 A1 | 7/2007 | Thompson |
| 2007/0156842 A1 | 7/2007 | Vermeulen et al. |
| 2007/0161402 A1 | 7/2007 | Ng et al. |
| 2007/0161411 A1 | 7/2007 | Liao et al. |
| 2007/0162514 A1 | 7/2007 | Civetta et al. |
| 2007/0165516 A1 | 7/2007 | Xu et al. |
| 2007/0167178 A1 | 7/2007 | Al-Harbi |
| 2007/0174420 A1 | 7/2007 | Khusial et al. |
| 2007/0174433 A1 | 7/2007 | Mendez et al. |
| 2007/0174470 A1 | 7/2007 | Burgess et al. |
| 2007/0175998 A1 | 8/2007 | Lev |
| 2007/0192122 A1 | 8/2007 | Routson et al. |
| 2007/0194913 A1 | 8/2007 | Yokoshima et al. |
| 2007/0198698 A1 | 8/2007 | Boyd et al. |
| 2007/0202850 A1 | 8/2007 | Pantalone et al. |
| 2007/0204341 A1 | 8/2007 | Rand et al. |
| 2007/0220080 A1 | 9/2007 | Humphrey |
| 2007/0220099 A1 | 9/2007 | Di Giorgio et al. |
| 2007/0226417 A1 | 9/2007 | Davis |
| 2007/0232263 A1 | 10/2007 | Chandhok et al. |
| 2007/0233855 A1 | 10/2007 | Brown et al. |
| 2007/0237318 A1 | 10/2007 | McGary |
| 2007/0240218 A1 | 10/2007 | Tuvell et al. |
| 2007/0245010 A1 | 10/2007 | Arn et al. |
| 2007/0245409 A1 | 10/2007 | Harris et al. |
| 2007/0249365 A1 | 10/2007 | Jendbro |
| 2007/0250591 A1 | 10/2007 | Milic-Frayling et al. |
| 2007/0254631 A1 | 11/2007 | Spooner |
| 2007/0255848 A1 | 11/2007 | Sewall et al. |
| 2007/0259673 A1 | 11/2007 | Willars et al. |
| 2007/0264993 A1 | 11/2007 | Hughes |
| 2007/0267492 A1 | 11/2007 | Maclaine Pont |
| 2007/0276925 A1 | 11/2007 | La Joie et al. |
| 2007/0276926 A1 | 11/2007 | LaJoie et al. |
| 2007/0277231 A1 | 11/2007 | Medvinsky et al. |
| 2007/0288469 A1 | 12/2007 | Shenfield |
| 2007/0290787 A1 | 12/2007 | Fiatal et al. |
| 2007/0293207 A1 | 12/2007 | Guedalia et al. |
| 2007/0293238 A1 | 12/2007 | Fiatal et al. |
| 2007/0293958 A1 | 12/2007 | Stehle et al. |
| 2007/0294295 A1 | 12/2007 | Finkelstein et al. |
| 2007/0294373 A1 | 12/2007 | Harrison |
| 2007/0294395 A1 | 12/2007 | Strub et al. |
| 2007/0294763 A1 | 12/2007 | Udezue et al. |
| 2007/0296701 A1 | 12/2007 | Pope et al. |
| 2007/0299631 A1 | 12/2007 | Macbeth et al. |
| 2007/0299918 A1 | 12/2007 | Roberts |
| 2007/0300273 A1 | 12/2007 | Turner |
| 2008/0001717 A1 | 1/2008 | Fiatal |
| 2008/0005695 A1 | 1/2008 | Ozzie et al. |
| 2008/0008095 A1 | 1/2008 | Gilfix |
| 2008/0009344 A1 | 1/2008 | Graham et al. |
| 2008/0010365 A1 | 1/2008 | Schneider |
| 2008/0016236 A1 | 1/2008 | Beverly et al. |
| 2008/0020786 A1 | 1/2008 | Smith et al. |
| 2008/0026778 A1 | 1/2008 | Cai et al. |
| 2008/0032718 A1 | 2/2008 | Suresh |
| 2008/0034031 A1 | 2/2008 | Weisbrot et al. |
| 2008/0034034 A1 | 2/2008 | Agrawal |
| 2008/0037787 A1 | 2/2008 | Boynton et al. |
| 2008/0039032 A1 | 2/2008 | Haumont |
| 2008/0043692 A1 | 2/2008 | Morita |
| 2008/0045253 A1 | 2/2008 | Mousseau et al. |
| 2008/0052206 A1 | 2/2008 | Edwards et al. |
| 2008/0056225 A1 | 3/2008 | Brok |
| 2008/0059308 A1 | 3/2008 | Gerken |
| 2008/0059398 A1 | 3/2008 | Tsutsui |
| 2008/0059582 A1 | 3/2008 | Hartikainen et al. |
| 2008/0061142 A1 | 3/2008 | Howcroft et al. |
| 2008/0068519 A1 | 3/2008 | Adler et al. |
| 2008/0072324 A1 | 3/2008 | Repasi et al. |

(56) References Cited

U.S. PATENT DOCUMENTS

| | | |
|---|---|---|
| 2008/0077506 A1 | 3/2008 | Rampell et al. |
| 2008/0077571 A1 | 3/2008 | Harris et al. |
| 2008/0085719 A1 | 4/2008 | Kuchibhotla et al. |
| 2008/0085724 A1 | 4/2008 | Cormier et al. |
| 2008/0086379 A1 | 4/2008 | Dion et al. |
| 2008/0086556 A1 | 4/2008 | Ramalingam et al. |
| 2008/0086599 A1 | 4/2008 | Maron et al. |
| 2008/0091773 A1 | 4/2008 | Hameen-Anttila |
| 2008/0096526 A1 | 4/2008 | Miettinen et al. |
| 2008/0098062 A1 | 4/2008 | Balia |
| 2008/0098120 A1 | 4/2008 | Johnson et al. |
| 2008/0103877 A1 | 5/2008 | Gerken |
| 2008/0104666 A1 | 5/2008 | Dillaway |
| 2008/0108298 A1 | 5/2008 | Selen et al. |
| 2008/0114881 A1 | 5/2008 | Lee et al. |
| 2008/0117922 A1 | 5/2008 | Cockrell et al. |
| 2008/0125225 A1 | 5/2008 | Lazaridis |
| 2008/0130663 A1 | 6/2008 | Fridman et al. |
| 2008/0133326 A1 | 6/2008 | Goncalves et al. |
| 2008/0133641 A1 | 6/2008 | Gent et al. |
| 2008/0133708 A1 | 6/2008 | Alvarado et al. |
| 2008/0134292 A1 | 6/2008 | Ariel et al. |
| 2008/0140665 A1 | 6/2008 | Ariel et al. |
| 2008/0140794 A1 | 6/2008 | Rybak |
| 2008/0146257 A1 | 6/2008 | Clegg |
| 2008/0148146 A1 | 6/2008 | Estrada et al. |
| 2008/0150704 A1 | 6/2008 | Igoe |
| 2008/0151817 A1 | 6/2008 | Fitchett et al. |
| 2008/0154870 A1 | 6/2008 | Evermann et al. |
| 2008/0155613 A1 | 6/2008 | Benya et al. |
| 2008/0163318 A1 | 7/2008 | Chen et al. |
| 2008/0166999 A1 | 7/2008 | Guedalia et al. |
| 2008/0167019 A1 | 7/2008 | Guedalia et al. |
| 2008/0168145 A1 | 7/2008 | Wilson |
| 2008/0172662 A1 | 7/2008 | Harris et al. |
| 2008/0177872 A1 | 7/2008 | Vengroff |
| 2008/0178294 A1 | 7/2008 | Hu et al. |
| 2008/0180228 A1 | 7/2008 | Wakefield et al. |
| 2008/0183800 A1 | 7/2008 | Herzog et al. |
| 2008/0184001 A1 | 7/2008 | Stager |
| 2008/0186166 A1 | 8/2008 | Zhou et al. |
| 2008/0189365 A1 | 8/2008 | Narayanaswami et al. |
| 2008/0192820 A1 | 8/2008 | Brooks et al. |
| 2008/0195819 A1 | 8/2008 | Dumont |
| 2008/0198995 A1 | 8/2008 | McGary et al. |
| 2008/0200161 A1 | 8/2008 | Morse et al. |
| 2008/0201225 A1 | 8/2008 | Maharajh et al. |
| 2008/0201362 A1 | 8/2008 | Multer et al. |
| 2008/0201751 A1 | 8/2008 | Ahmed et al. |
| 2008/0207182 A1 | 8/2008 | Maharajh et al. |
| 2008/0209491 A1 | 8/2008 | Hasek |
| 2008/0214148 A1 | 9/2008 | Ramer et al. |
| 2008/0216094 A1 | 9/2008 | Anderson et al. |
| 2008/0220797 A1 | 9/2008 | Meiby et al. |
| 2008/0221715 A1 | 9/2008 | Krzyzanowski et al. |
| 2008/0222271 A1 | 9/2008 | Spires |
| 2008/0232290 A1 | 9/2008 | Elzur et al. |
| 2008/0233983 A1 | 9/2008 | Park et al. |
| 2008/0235351 A1 | 9/2008 | Banga et al. |
| 2008/0235383 A1 | 9/2008 | Schneider |
| 2008/0242370 A1 | 10/2008 | Lando et al. |
| 2008/0256090 A1 | 10/2008 | Dietterich et al. |
| 2008/0261663 A1 | 10/2008 | Park et al. |
| 2008/0263170 A1 | 10/2008 | Caron et al. |
| 2008/0270379 A1 | 10/2008 | Ramakrishna |
| 2008/0271123 A1 | 10/2008 | Ollis et al. |
| 2008/0273498 A1 | 11/2008 | Jalil et al. |
| 2008/0281798 A1 | 11/2008 | Chatterjee et al. |
| 2008/0288659 A1 | 11/2008 | Hasha et al. |
| 2008/0294769 A1 | 11/2008 | Doi et al. |
| 2008/0298386 A1 | 12/2008 | Fiatal |
| 2008/0299956 A1 | 12/2008 | Bailey et al. |
| 2008/0301231 A1 | 12/2008 | Mehta et al. |
| 2008/0301300 A1 | 12/2008 | Toub |
| 2008/0305819 A1 | 12/2008 | Chun et al. |
| 2008/0307035 A1 | 12/2008 | Burckart et al. |
| 2008/0313282 A1 | 12/2008 | Warila et al. |
| 2008/0320577 A1 | 12/2008 | Larduinat |
| 2009/0006116 A1 | 1/2009 | Baker et al. |
| 2009/0010204 A1 | 1/2009 | Pratt, Jr. et al. |
| 2009/0010259 A1 | 1/2009 | Sirotkin |
| 2009/0012841 A1 | 1/2009 | Saft et al. |
| 2009/0016526 A1 | 1/2009 | Fiatal et al. |
| 2009/0019105 A1 | 1/2009 | Sebastian |
| 2009/0019141 A1 | 1/2009 | Bush et al. |
| 2009/0019153 A1 | 1/2009 | Sebastian |
| 2009/0019485 A1 | 1/2009 | Ellis et al. |
| 2009/0019532 A1 | 1/2009 | Jacobsen et al. |
| 2009/0024794 A1 | 1/2009 | Iyer et al. |
| 2009/0027222 A1 | 1/2009 | Larsson et al. |
| 2009/0031006 A1 | 1/2009 | Johnson |
| 2009/0043741 A1 | 2/2009 | Kim |
| 2009/0049166 A1 | 2/2009 | Roman et al. |
| 2009/0049173 A1 | 2/2009 | Pulito et al. |
| 2009/0049482 A1 | 2/2009 | Auerbach et al. |
| 2009/0052372 A1 | 2/2009 | Durazzo et al. |
| 2009/0054034 A1 | 2/2009 | Backholm et al. |
| 2009/0055353 A1 | 2/2009 | Meema |
| 2009/0059950 A1 | 3/2009 | Gao et al. |
| 2009/0063647 A1 | 3/2009 | Backholm et al. |
| 2009/0064346 A1 | 3/2009 | Larsson et al. |
| 2009/0070526 A1 | 3/2009 | Tetrick et al. |
| 2009/0075683 A1 | 3/2009 | Backholm et al. |
| 2009/0077205 A1 | 3/2009 | Quinet et al. |
| 2009/0077263 A1 | 3/2009 | Koganti et al. |
| 2009/0077326 A1 | 3/2009 | Motohashi |
| 2009/0081944 A1 | 3/2009 | Yavuz et al. |
| 2009/0083602 A1 | 3/2009 | Sarkar et al. |
| 2009/0086651 A1 | 4/2009 | Luft et al. |
| 2009/0094317 A1 | 4/2009 | Venkitaraman |
| 2009/0100416 A1 | 4/2009 | Brown et al. |
| 2009/0100506 A1 | 4/2009 | Whang et al. |
| 2009/0109983 A1 | 4/2009 | Dixon et al. |
| 2009/0110179 A1 | 4/2009 | Elsey et al. |
| 2009/0112778 A1 | 4/2009 | Beck et al. |
| 2009/0119266 A1 | 5/2009 | Fitzpatrick et al. |
| 2009/0122772 A1 | 5/2009 | Jung |
| 2009/0125523 A1 | 5/2009 | Fitzpatrick et al. |
| 2009/0131045 A1 | 5/2009 | Feuer et al. |
| 2009/0138427 A1 | 5/2009 | Kalavade |
| 2009/0144632 A1 | 6/2009 | Mendez |
| 2009/0147008 A1 | 6/2009 | Do et al. |
| 2009/0149203 A1 | 6/2009 | Backholm et al. |
| 2009/0156178 A1 | 6/2009 | Elsey et al. |
| 2009/0157792 A1 | 6/2009 | Fiatal |
| 2009/0164433 A1 | 6/2009 | R. et al. |
| 2009/0164605 A1 | 6/2009 | Lusher et al. |
| 2009/0165115 A1 | 6/2009 | Toumura et al. |
| 2009/0172565 A1 | 7/2009 | Jackson et al. |
| 2009/0181641 A1 | 7/2009 | Fiatal |
| 2009/0182500 A1 | 7/2009 | Dicke |
| 2009/0187939 A1 | 7/2009 | Lajoie |
| 2009/0191903 A1 | 7/2009 | Fiatal |
| 2009/0193130 A1 | 7/2009 | Fiatal |
| 2009/0193338 A1 | 7/2009 | Fiatal |
| 2009/0204682 A1 | 8/2009 | Jeyaseelan et al. |
| 2009/0213837 A1 | 8/2009 | Ku et al. |
| 2009/0215504 A1 | 8/2009 | Lando |
| 2009/0216903 A1 | 8/2009 | Howell et al. |
| 2009/0221326 A1 | 9/2009 | Roussel et al. |
| 2009/0222584 A1 | 9/2009 | Josefsberg et al. |
| 2009/0225778 A1 | 9/2009 | Sharif-Ahmadi et al. |
| 2009/0228545 A1 | 9/2009 | Mendez et al. |
| 2009/0233595 A1 | 9/2009 | Harris et al. |
| 2009/0234861 A1 | 9/2009 | Ramer et al. |
| 2009/0241180 A1 | 9/2009 | Fiatal |
| 2009/0248670 A1 | 10/2009 | Fiatal |
| 2009/0248696 A1 | 10/2009 | Rowles et al. |
| 2009/0248794 A1 | 10/2009 | Helms et al. |
| 2009/0248878 A1 | 10/2009 | Tran et al. |
| 2009/0249480 A1 | 10/2009 | Osipkov et al. |
| 2009/0249482 A1 | 10/2009 | Sarathy |
| 2009/0252136 A1 | 10/2009 | Mahany et al. |
| 2009/0254589 A1 | 10/2009 | Nair et al. |

(56) References Cited

U.S. PATENT DOCUMENTS

| | | |
|---|---|---|
| 2009/0254663 A1 | 10/2009 | Alperovitch et al. |
| 2009/0254971 A1 | 10/2009 | Herz et al. |
| 2009/0264138 A1 | 10/2009 | Kang et al. |
| 2009/0268672 A1 | 10/2009 | Kline et al. |
| 2009/0271491 A1 | 10/2009 | Pan |
| 2009/0282125 A1 | 11/2009 | Jeide et al. |
| 2009/0282130 A1 | 11/2009 | Antoniou et al. |
| 2009/0286531 A1 | 11/2009 | Bhatt et al. |
| 2009/0287750 A1 | 11/2009 | Banavar et al. |
| 2009/0299817 A1 | 12/2009 | Fok et al. |
| 2009/0307133 A1 | 12/2009 | Holloway et al. |
| 2009/0307196 A1 | 12/2009 | Shuster |
| 2009/0307731 A1 | 12/2009 | Beyabani |
| 2009/0310501 A1 | 12/2009 | Catovic et al. |
| 2009/0318171 A1 | 12/2009 | Backholm et al. |
| 2009/0323678 A1 | 12/2009 | Wang |
| 2009/0325565 A1 | 12/2009 | Backholm |
| 2009/0327390 A1 | 12/2009 | Tran et al. |
| 2009/0327819 A1 | 12/2009 | Pan |
| 2010/0010993 A1 | 1/2010 | Hussey, Jr. et al. |
| 2010/0011031 A1 | 1/2010 | Huang et al. |
| 2010/0023582 A1 | 1/2010 | Pedersen et al. |
| 2010/0036885 A1 | 2/2010 | Shen et al. |
| 2010/0042691 A1 | 2/2010 | Maguire |
| 2010/0042718 A1 | 2/2010 | Morris |
| 2010/0049852 A1 | 2/2010 | Whitnah et al. |
| 2010/0049872 A1 | 2/2010 | Roskind |
| 2010/0057924 A1 | 3/2010 | Rauber et al. |
| 2010/0064341 A1 | 3/2010 | Aldera |
| 2010/0067413 A1 | 3/2010 | Schneider et al. |
| 2010/0069127 A1 | 3/2010 | Fiennes |
| 2010/0076994 A1 | 3/2010 | Soroca et al. |
| 2010/0077035 A1 | 3/2010 | Li et al. |
| 2010/0077083 A1 | 3/2010 | Tran et al. |
| 2010/0082811 A1 | 4/2010 | Van Der Merwe et al. |
| 2010/0083255 A1 | 4/2010 | Bane et al. |
| 2010/0087167 A1 | 4/2010 | Tsurutome et al. |
| 2010/0087179 A1 | 4/2010 | Makavy et al. |
| 2010/0088722 A1 | 4/2010 | Jiang |
| 2010/0093273 A1 | 4/2010 | Hohl |
| 2010/0093346 A1 | 4/2010 | Song et al. |
| 2010/0095018 A1 | 4/2010 | Khemani et al. |
| 2010/0095065 A1 | 4/2010 | Gray et al. |
| 2010/0099421 A1 | 4/2010 | Patel et al. |
| 2010/0100952 A1 | 4/2010 | Sample et al. |
| 2010/0115050 A1 | 5/2010 | Sultenfuss et al. |
| 2010/0118190 A1 | 5/2010 | Salfati et al. |
| 2010/0121744 A1 | 5/2010 | Belz et al. |
| 2010/0131593 A1 | 5/2010 | Kihara et al. |
| 2010/0131617 A1 | 5/2010 | Osborne et al. |
| 2010/0146107 A1 | 6/2010 | Fiatal |
| 2010/0146607 A1 | 6/2010 | Piepenbrink et al. |
| 2010/0149975 A1 | 6/2010 | Tripathi et al. |
| 2010/0153652 A1 | 6/2010 | Thomas et al. |
| 2010/0154044 A1 | 6/2010 | Manku |
| 2010/0174735 A1 | 7/2010 | Fiatal |
| 2010/0174756 A1 | 7/2010 | Lazaridis et al. |
| 2010/0174861 A1 | 7/2010 | Katz et al. |
| 2010/0174939 A1 | 7/2010 | Vexler |
| 2010/0180005 A1 | 7/2010 | Sebastian et al. |
| 2010/0186011 A1 | 7/2010 | Magenheimer |
| 2010/0188994 A1 | 7/2010 | Raleigh |
| 2010/0192212 A1 | 7/2010 | Raleigh |
| 2010/0197282 A1 | 8/2010 | Uchida |
| 2010/0198752 A1 | 8/2010 | Digon et al. |
| 2010/0203876 A1 | 8/2010 | Krishnaswamy |
| 2010/0205148 A1 | 8/2010 | Leblanc et al. |
| 2010/0207870 A1 | 8/2010 | Cho |
| 2010/0211651 A1 | 8/2010 | Guedalia et al. |
| 2010/0212010 A1 | 8/2010 | Stringer et al. |
| 2010/0214984 A1 | 8/2010 | Cho et al. |
| 2010/0220619 A1 | 9/2010 | Chikira et al. |
| 2010/0223364 A1 | 9/2010 | Wei |
| 2010/0227594 A1 | 9/2010 | DeVries |
| 2010/0228863 A1 | 9/2010 | Kawauchi |
| 2010/0229096 A1 | 9/2010 | Maiocco et al. |
| 2010/0235473 A1 | 9/2010 | Koren et al. |
| 2010/0238915 A1 | 9/2010 | Cayla et al. |
| 2010/0250695 A1 | 9/2010 | Shenfield et al. |
| 2010/0250706 A1 | 9/2010 | Burckart et al. |
| 2010/0250733 A1 | 9/2010 | Turanyi et al. |
| 2010/0250986 A1 | 9/2010 | Black et al. |
| 2010/0251366 A1 | 9/2010 | Baldry |
| 2010/0257580 A1 | 10/2010 | Zhao |
| 2010/0260038 A1 | 10/2010 | Dhodapkar et al. |
| 2010/0260173 A1 | 10/2010 | Johnson |
| 2010/0262487 A1 | 10/2010 | Edwards et al. |
| 2010/0262664 A1 | 10/2010 | Brown et al. |
| 2010/0268757 A1 | 10/2010 | Fisher |
| 2010/0274857 A1 | 10/2010 | Garza et al. |
| 2010/0274983 A1 | 10/2010 | Murphy et al. |
| 2010/0278161 A1 | 11/2010 | Ore et al. |
| 2010/0279662 A1 | 11/2010 | Kuusinen et al. |
| 2010/0281112 A1 | 11/2010 | Plamondon |
| 2010/0284327 A1 | 11/2010 | Miklos |
| 2010/0293335 A1 | 11/2010 | Muthiah et al. |
| 2010/0299223 A1 | 11/2010 | Crouch |
| 2010/0299455 A1 | 11/2010 | Master et al. |
| 2010/0299518 A1 | 11/2010 | Viswanathan et al. |
| 2010/0305983 A1 | 12/2010 | De Marcken |
| 2010/0312946 A1 | 12/2010 | Bold et al. |
| 2010/0313018 A1 | 12/2010 | Jorgensen |
| 2010/0315535 A1 | 12/2010 | Nurit et al. |
| 2010/0317340 A1 | 12/2010 | Lee et al. |
| 2010/0319054 A1 | 12/2010 | Mehta et al. |
| 2010/0322124 A1 | 12/2010 | Luoma et al. |
| 2010/0323664 A1 | 12/2010 | Sivaram et al. |
| 2010/0323730 A1 | 12/2010 | Karmarkar |
| 2010/0325306 A1 | 12/2010 | Vimpari et al. |
| 2010/0332513 A1 | 12/2010 | Azar et al. |
| 2010/0332680 A1 | 12/2010 | Anderson et al. |
| 2011/0019978 A1 | 1/2011 | Jagmag |
| 2011/0022812 A1 | 1/2011 | Linden et al. |
| 2011/0023084 A1 | 1/2011 | Kraemer |
| 2011/0028129 A1 | 2/2011 | Hutchison et al. |
| 2011/0029378 A1 | 2/2011 | Ramer et al. |
| 2011/0035799 A1 | 2/2011 | Handler |
| 2011/0040718 A1 | 2/2011 | Tendjoukian et al. |
| 2011/0040872 A1 | 2/2011 | Blackburn et al. |
| 2011/0044304 A1 | 2/2011 | Connelly et al. |
| 2011/0047033 A1 | 2/2011 | Mahaffey et al. |
| 2011/0047594 A1 | 2/2011 | Mahaffey et al. |
| 2011/0065419 A1 | 3/2011 | Book et al. |
| 2011/0065424 A1 | 3/2011 | Estevez et al. |
| 2011/0066646 A1 | 3/2011 | Danado et al. |
| 2011/0066715 A1 | 3/2011 | Schieder et al. |
| 2011/0069663 A1 | 3/2011 | Shu et al. |
| 2011/0072306 A1 | 3/2011 | Racey et al. |
| 2011/0083186 A1 | 4/2011 | Niemela et al. |
| 2011/0093725 A1 | 4/2011 | Theocharous et al. |
| 2011/0093917 A1 | 4/2011 | Alcorn et al. |
| 2011/0095903 A1 | 4/2011 | Gudlavenkatasiva et al. |
| 2011/0099363 A1 | 4/2011 | Boynton et al. |
| 2011/0113109 A1 | 5/2011 | LeVasseur et al. |
| 2011/0119134 A1 | 5/2011 | Zivkovic et al. |
| 2011/0119217 A1 | 5/2011 | Moon et al. |
| 2011/0119444 A1 | 5/2011 | DeCusatis et al. |
| 2011/0126060 A1 | 5/2011 | Grube et al. |
| 2011/0126250 A1 | 5/2011 | Turner |
| 2011/0137973 A1 | 6/2011 | Wei et al. |
| 2011/0138102 A1 | 6/2011 | Glikson et al. |
| 2011/0138402 A1 | 6/2011 | Fleming |
| 2011/0145646 A1 | 6/2011 | Harris et al. |
| 2011/0151944 A1 | 6/2011 | Morgan |
| 2011/0153816 A1 | 6/2011 | Lloyd et al. |
| 2011/0153937 A1 | 6/2011 | Annamalaisami et al. |
| 2011/0158239 A1 | 6/2011 | Mohaban |
| 2011/0161484 A1 | 6/2011 | Van Den Bogaert et al. |
| 2011/0165889 A1 | 7/2011 | Fiatal et al. |
| 2011/0170410 A1 | 7/2011 | Zhao et al. |
| 2011/0170464 A1 | 7/2011 | Sengottaiyan et al. |
| 2011/0173055 A1 | 7/2011 | Ross et al. |
| 2011/0177847 A1 | 7/2011 | Huang |
| 2011/0179138 A1 | 7/2011 | Van Geest et al. |

(56) References Cited

U.S. PATENT DOCUMENTS

| | | |
|---|---|---|
| 2011/0179377 A1 | 7/2011 | Fleming |
| 2011/0182220 A1 | 7/2011 | Black et al. |
| 2011/0184576 A1 | 7/2011 | Hasan et al. |
| 2011/0184827 A1 | 7/2011 | Hubert |
| 2011/0185355 A1 | 7/2011 | Chawla et al. |
| 2011/0189997 A1 | 8/2011 | Tiwari et al. |
| 2011/0190014 A1 | 8/2011 | Fiatal |
| 2011/0191474 A1 | 8/2011 | Fiatal |
| 2011/0194539 A1 | 8/2011 | Blasinski et al. |
| 2011/0199905 A1 | 8/2011 | Pinheiro et al. |
| 2011/0201304 A1 | 8/2011 | Sutaria et al. |
| 2011/0202988 A1 | 8/2011 | Otranen et al. |
| 2011/0207436 A1 | 8/2011 | van Gent et al. |
| 2011/0208810 A1 | 8/2011 | Li et al. |
| 2011/0213800 A1 | 9/2011 | Saros et al. |
| 2011/0213898 A1 | 9/2011 | Fiatal et al. |
| 2011/0214182 A1 | 9/2011 | Adams et al. |
| 2011/0217982 A1 | 9/2011 | Zhao |
| 2011/0218951 A1 | 9/2011 | Kline et al. |
| 2011/0219133 A1 | 9/2011 | Shanmugham |
| 2011/0225646 A1 | 9/2011 | Crawford |
| 2011/0235528 A1 | 9/2011 | Racz et al. |
| 2011/0237222 A1 | 9/2011 | Niejadlik |
| 2011/0238772 A1 | 9/2011 | Fiatal |
| 2011/0241872 A1 | 10/2011 | Mahaffey |
| 2011/0244859 A1 | 10/2011 | Tsuda |
| 2011/0246950 A1 | 10/2011 | Luna et al. |
| 2011/0249553 A1 | 10/2011 | Wang et al. |
| 2011/0252088 A1 | 10/2011 | Fiatal |
| 2011/0264622 A1 | 10/2011 | Vargas et al. |
| 2011/0264731 A1 | 10/2011 | Knowles et al. |
| 2011/0265174 A1 | 10/2011 | Thornton et al. |
| 2011/0294463 A1 | 12/2011 | Fiatal |
| 2011/0294464 A1 | 12/2011 | Fiatal |
| 2011/0296050 A1 | 12/2011 | Cherukuri |
| 2011/0296120 A1 | 12/2011 | Khan |
| 2011/0296415 A1 | 12/2011 | Khan et al. |
| 2011/0299454 A1 | 12/2011 | Krishnaswamy |
| 2011/0302154 A1 | 12/2011 | Snyder |
| 2011/0307541 A1 | 12/2011 | Walsh et al. |
| 2011/0320614 A1 | 12/2011 | Makavy et al. |
| 2012/0005276 A1 | 1/2012 | Guo et al. |
| 2012/0008536 A1 | 1/2012 | Tervahauta et al. |
| 2012/0020219 A1 | 1/2012 | Kamiya et al. |
| 2012/0022980 A1 | 1/2012 | Angelone |
| 2012/0023190 A1 | 1/2012 | Backholm et al. |
| 2012/0023226 A1 | 1/2012 | Petersen et al. |
| 2012/0023236 A1 | 1/2012 | Backholm et al. |
| 2012/0026879 A1 | 2/2012 | Foottit et al. |
| 2012/0026947 A1 | 2/2012 | Miller et al. |
| 2012/0030280 A1 | 2/2012 | Wang et al. |
| 2012/0030750 A1 | 2/2012 | Bhargava et al. |
| 2012/0034922 A1 | 2/2012 | Jones et al. |
| 2012/0054386 A1 | 3/2012 | Hanes |
| 2012/0072910 A1 | 3/2012 | Martin et al. |
| 2012/0077482 A1 | 3/2012 | Backholm |
| 2012/0078725 A1 | 3/2012 | Maitra et al. |
| 2012/0078996 A1 | 3/2012 | Shah |
| 2012/0084397 A1 | 4/2012 | Shinohara |
| 2012/0096058 A1 | 4/2012 | Mameri et al. |
| 2012/0096092 A1 | 4/2012 | Davidge et al. |
| 2012/0099592 A1 | 4/2012 | Ludwig |
| 2012/0108200 A1 | 5/2012 | Rubin et al. |
| 2012/0108225 A1 | 5/2012 | Luna et al. |
| 2012/0110109 A1 | 5/2012 | Luna et al. |
| 2012/0110110 A1 | 5/2012 | Luna et al. |
| 2012/0110111 A1 | 5/2012 | Luna et al. |
| 2012/0110112 A1 | 5/2012 | Luna et al. |
| 2012/0110118 A1 | 5/2012 | Luna et al. |
| 2012/0110171 A1 | 5/2012 | Luna et al. |
| 2012/0110173 A1 | 5/2012 | Luna et al. |
| 2012/0110174 A1 | 5/2012 | Wootton et al. |
| 2012/0110275 A1 | 5/2012 | Ganti et al. |
| 2012/0130973 A1 | 5/2012 | Tamm et al. |
| 2012/0131095 A1 | 5/2012 | Luna et al. |
| 2012/0131184 A1 | 5/2012 | Luna et al. |
| 2012/0131685 A1 | 5/2012 | Broch et al. |
| 2012/0135726 A1 | 5/2012 | Luna et al. |
| 2012/0140750 A1 | 6/2012 | Yan et al. |
| 2012/0144038 A1 | 6/2012 | Hildebrand |
| 2012/0144336 A1 | 6/2012 | Pinter et al. |
| 2012/0144384 A1 | 6/2012 | Baek |
| 2012/0149352 A1 | 6/2012 | Backholm et al. |
| 2012/0151044 A1 | 6/2012 | Luna et al. |
| 2012/0157170 A1 | 6/2012 | Backholm et al. |
| 2012/0158837 A1 | 6/2012 | Kaul |
| 2012/0158908 A1 | 6/2012 | Luna et al. |
| 2012/0170496 A1 | 7/2012 | Yang et al. |
| 2012/0170569 A1 | 7/2012 | Al-Khudairi |
| 2012/0173616 A1 | 7/2012 | Luna et al. |
| 2012/0174220 A1 | 7/2012 | Rodriguez |
| 2012/0176968 A1 | 7/2012 | Luna |
| 2012/0178414 A1 | 7/2012 | Fiatal |
| 2012/0179801 A1 | 7/2012 | Luna et al. |
| 2012/0185597 A1 | 7/2012 | Luna |
| 2012/0185918 A1 | 7/2012 | Backholm et al. |
| 2012/0198046 A1 | 8/2012 | Shah et al. |
| 2012/0198516 A1 | 8/2012 | Lim |
| 2012/0203761 A1 | 8/2012 | Biran et al. |
| 2012/0209923 A1 | 8/2012 | Mathur et al. |
| 2012/0210121 A1 | 8/2012 | Boynton et al. |
| 2012/0221697 A1 | 8/2012 | Sainio et al. |
| 2012/0224528 A1 | 9/2012 | Tapia et al. |
| 2012/0226767 A1 | 9/2012 | Luna et al. |
| 2012/0227059 A1 | 9/2012 | Fleming |
| 2012/0246333 A1 | 9/2012 | Fiatal |
| 2012/0254417 A1 | 10/2012 | Luna |
| 2012/0265836 A1 | 10/2012 | Nemoto et al. |
| 2012/0271903 A1 | 10/2012 | Luna |
| 2012/0271908 A1 | 10/2012 | Luna et al. |
| 2012/0278431 A1 | 11/2012 | Luna |
| 2012/0278432 A1 | 11/2012 | Luna |
| 2012/0278464 A1 | 11/2012 | Lehane et al. |
| 2012/0278886 A1 | 11/2012 | Luna |
| 2012/0284356 A1 | 11/2012 | Luna |
| 2012/0289239 A1 | 11/2012 | Luna et al. |
| 2012/0290642 A1 | 11/2012 | Shaughnessy et al. |
| 2012/0290675 A1 | 11/2012 | Luna et al. |
| 2012/0290717 A1 | 11/2012 | Luna |
| 2012/0295645 A1 | 11/2012 | Yariv et al. |
| 2012/0297213 A1 | 11/2012 | Nishida |
| 2012/0304288 A1 | 11/2012 | Wright et al. |
| 2012/0316992 A1 | 12/2012 | Oborne |
| 2012/0317284 A1 | 12/2012 | Raleigh et al. |
| 2012/0317370 A1 | 12/2012 | Luna |
| 2012/0324041 A1 | 12/2012 | Gerber et al. |
| 2012/0324575 A1 | 12/2012 | Choi et al. |
| 2012/0327779 A1 | 12/2012 | Gell et al. |
| 2012/0329442 A1 | 12/2012 | Luft et al. |
| 2012/0331059 A1 | 12/2012 | Luna |
| 2012/0331087 A1 | 12/2012 | Luna et al. |
| 2013/0010693 A1 | 1/2013 | Luna et al. |
| 2013/0012180 A1 | 1/2013 | Backholm et al. |
| 2013/0013726 A1 | 1/2013 | Westberg et al. |
| 2013/0023232 A1 | 1/2013 | Mendiola |
| 2013/0031191 A1 | 1/2013 | Bott |
| 2013/0031599 A1 | 1/2013 | Luna et al. |
| 2013/0031600 A1 | 1/2013 | Luna et al. |
| 2013/0031601 A1 | 1/2013 | Bott |
| 2013/0041974 A1 | 2/2013 | Luna et al. |
| 2013/0052990 A1 | 2/2013 | Zhang |
| 2013/0110636 A1 | 5/2013 | Bott |
| 2013/0110637 A1 | 5/2013 | Bott |
| 2013/0110758 A1 | 5/2013 | Jung et al. |
| 2013/0122821 A1 | 5/2013 | Yeung |
| 2013/0124442 A1 | 5/2013 | Tendjoukian et al. |
| 2013/0142050 A1 | 6/2013 | Luna |
| 2013/0143609 A1 | 6/2013 | Richardson et al. |
| 2013/0145010 A1 | 6/2013 | Luna et al. |
| 2013/0145017 A1 | 6/2013 | Luna |
| 2013/0151648 A1 | 6/2013 | Luna |
| 2013/0151649 A1 | 6/2013 | Luna |
| 2013/0151709 A1 | 6/2013 | Luna |
| 2013/0159395 A1 | 6/2013 | Backholm et al. |

(56) References Cited

U.S. PATENT DOCUMENTS

| | | |
|---|---|---|
| 2013/0159511 A1 | 6/2013 | Backholm et al. |
| 2013/0165084 A1 | 6/2013 | Xu et al. |
| 2013/0166669 A1 | 6/2013 | Luna et al. |
| 2013/0170348 A1 | 7/2013 | Luna et al. |
| 2013/0173756 A1 | 7/2013 | Luna et al. |
| 2013/0178195 A1 | 7/2013 | Luna et al. |
| 2013/0182572 A1 | 7/2013 | Backholm et al. |
| 2013/0203433 A1 | 8/2013 | Luna et al. |
| 2013/0205366 A1 | 8/2013 | Luna et al. |
| 2013/0267209 A1 | 10/2013 | Bott |
| 2013/0268655 A1 | 10/2013 | Luna et al. |
| 2013/0268656 A1 | 10/2013 | Bott |
| 2013/0275563 A1 | 10/2013 | Luna et al. |
| 2013/0275586 A1 | 10/2013 | Luna et al. |
| 2013/0291099 A1 | 10/2013 | Donfried et al. |
| 2013/0304604 A1 | 11/2013 | Hoffman et al. |
| 2013/0311594 A1 | 11/2013 | Luna et al. |
| 2013/0315088 A1 | 11/2013 | Gerber et al. |
| 2013/0315161 A1 | 11/2013 | Luna et al. |
| 2013/0316675 A1 | 11/2013 | Luna et al. |
| 2014/0025953 A1 | 1/2014 | Venters, III et al. |
| 2014/0113653 A1 | 4/2014 | Wendling et al. |

FOREIGN PATENT DOCUMENTS

| | | |
|---|---|---|
| CA | 2806529 A1 | 2/2012 |
| CA | 2806548 A1 | 2/2012 |
| CA | 2806549 A1 | 2/2012 |
| CA | 2806550 A1 | 2/2012 |
| CA | 2806557 A1 | 2/2012 |
| CA | 2798523 A1 | 5/2012 |
| CA | 2797631 A1 | 11/2012 |
| CA | 2797631 C | 11/2013 |
| CN | 103404193 A | 11/2013 |
| CN | 103620576 A | 3/2014 |
| EP | 0772327 A2 | 5/1997 |
| EP | 0993165 A2 | 4/2000 |
| EP | 1278390 A1 | 1/2003 |
| EP | 1135741 B1 | 2/2004 |
| EP | 1422899 A1 | 5/2004 |
| EP | 1466261 A1 | 10/2004 |
| EP | 1466435 A1 | 10/2004 |
| EP | 1482702 A1 | 12/2004 |
| EP | 1483689 A1 | 12/2004 |
| EP | 1669878 A1 | 6/2006 |
| EP | 1775911 A1 | 4/2007 |
| EP | 1815634 A1 | 8/2007 |
| EP | 1815652 A1 | 8/2007 |
| EP | 1817883 A1 | 8/2007 |
| EP | 2060085 A2 | 5/2009 |
| EP | 2080123 A1 | 7/2009 |
| EP | 2120014 A1 | 11/2009 |
| EP | 2122973 A1 | 11/2009 |
| EP | 2206390 A1 | 7/2010 |
| EP | 2267968 A1 | 12/2010 |
| EP | 2332294 A1 | 6/2011 |
| EP | 2378712 A1 | 10/2011 |
| EP | 2386164 A2 | 11/2011 |
| EP | 2395412 A1 | 12/2011 |
| EP | 2396953 A1 | 12/2011 |
| EP | 2465275 A2 | 6/2012 |
| EP | 2503473 A1 | 9/2012 |
| EP | 2556441 A2 | 2/2013 |
| EP | 2591628 A1 | 5/2013 |
| EP | 2596658 A1 | 5/2013 |
| EP | 2599003 A1 | 6/2013 |
| EP | 2599004 A1 | 6/2013 |
| EP | 2599280 A2 | 6/2013 |
| EP | 2599345 A2 | 6/2013 |
| EP | 2599346 A2 | 6/2013 |
| EP | 2599363 A2 | 6/2013 |
| EP | 2621144 A1 | 7/2013 |
| EP | 2635973 A2 | 9/2013 |
| EP | 2636252 A2 | 9/2013 |
| EP | 2636268 A2 | 9/2013 |
| EP | 2661697 A2 | 11/2013 |
| EP | 2700019 A2 | 2/2014 |
| EP | 2700020 A2 | 2/2014 |
| EP | 2700021 A2 | 2/2014 |
| EP | 2702500 A2 | 3/2014 |
| EP | 2702524 A1 | 3/2014 |
| EP | 2702827 A2 | 3/2014 |
| FI | 117152 B1 | 6/2006 |
| FI | 118288 B1 | 9/2007 |
| FI | 119581-BI | 12/2008 |
| FI | 123227 B | 12/2013 |
| GB | 2415335 A | 12/2005 |
| GB | 2476354 A | 6/2011 |
| GB | 2493473 A | 2/2013 |
| GB | 2495058 A | 3/2013 |
| GB | 2495066 A | 3/2013 |
| GB | 2495263 A | 4/2013 |
| GB | 2495455 A | 4/2013 |
| GB | 2495463 A | 4/2013 |
| GB | 2495877 A | 4/2013 |
| GB | 2496537 A | 5/2013 |
| GB | 2497012 A | 5/2013 |
| GB | 2493473 B | 6/2013 |
| GB | 2498064 A | 7/2013 |
| GB | 2499089 A | 8/2013 |
| GB | 2499306 A | 8/2013 |
| GB | 2499534 A | 8/2013 |
| GB | 2499741 A | 8/2013 |
| GB | 2499747 A | 8/2013 |
| GB | 2499936 A | 9/2013 |
| GB | 2500327 A | 9/2013 |
| GB | 2500333 A | 9/2013 |
| GB | 2500334 A | 9/2013 |
| GB | 2495463 B | 10/2013 |
| GB | 2495877 B | 10/2013 |
| GB | 2497012 B | 10/2013 |
| GB | 2501416 A | 10/2013 |
| GB | 2495455 B | 11/2013 |
| GB | 2502168 A | 11/2013 |
| GB | 2495066 B | 12/2013 |
| GB | 2503077 A | 12/2013 |
| GB | 2503405 A | 12/2013 |
| GB | 2503990 A | 1/2014 |
| GB | 2504019 A | 1/2014 |
| GB | 2504037 A | 1/2014 |
| GB | 2504411 A | 1/2014 |
| GB | 2504634 A | 2/2014 |
| GB | 2505103 A | 2/2014 |
| GB | 2495058 B | 3/2014 |
| GB | 2500334 B | 3/2014 |
| GB | 2504019 B | 3/2014 |
| GB | 2505585 A | 3/2014 |
| GB | 2506296 A | 3/2014 |
| GB | 2495263 B | 4/2014 |
| GB | 2499747 B | 4/2014 |
| GB | 2504634 B | 4/2014 |
| JP | 4154233 A | 5/1992 |
| JP | 09-331288 A | 12/1997 |
| JP | 10-178453 A | 6/1998 |
| JP | 10-336372 A | 12/1998 |
| JP | 2001-160041 A | 6/2001 |
| JP | 2001-218185 A | 8/2001 |
| JP | 2001-265681 A | 9/2001 |
| JP | 2001-350718 A | 12/2001 |
| JP | 2001-356973 A | 12/2001 |
| JP | 2002-351905 A | 12/2002 |
| JP | 2003-099162 A | 4/2003 |
| JP | 2003-323402 A | 11/2003 |
| JP | 2005-515664 A | 5/2005 |
| JP | 2005-520377 A | 7/2005 |
| JP | 2006-060795 A | 3/2006 |
| JP | 2007-172044 A | 7/2007 |
| JP | 2007-226783 A | 9/2007 |
| JP | 2007-528641 A | 10/2007 |
| JP | 2008-177740 A | 7/2008 |
| JP | 2009-060631 A | 3/2009 |
| JP | 2009-207177 A | 9/2009 |
| JP | 4386732 | 12/2009 |

(56) References Cited

FOREIGN PATENT DOCUMENTS

| | | |
|---|---|---|
| JP | 2010-045628 A | 2/2010 |
| JP | 2010-239366 A | 10/2010 |
| JP | 2011-511580 A | 4/2011 |
| JP | 2013-537754 A | 10/2013 |
| JP | 2013-539258 A | 10/2013 |
| JP | 2013-539259 A | 10/2013 |
| JP | 2013-541238 A | 11/2013 |
| KR | 2001-0018568 A | 3/2001 |
| KR | 2006-0068186 A | 6/2006 |
| KR | 2007-0071858 A1 | 7/2007 |
| KR | 10-0765238 B1 | 10/2007 |
| KR | 2007-0102091 A1 | 10/2007 |
| KR | 2007-0112412 A | 11/2007 |
| KR | 2007-0117874 A | 12/2007 |
| KR | 2008-0067477 A | 7/2008 |
| KR | 2009-0038217 A | 4/2009 |
| KR | 2009-0054528 A | 6/2009 |
| KR | 2009-0077515 A | 7/2009 |
| KR | 2010-0064605 A | 6/2010 |
| KR | 2011-0138122 A | 12/2011 |
| KR | 10-1227769 B1 | 1/2013 |
| KR | 10-1227821 B1 | 1/2013 |
| WO | WO-97/41661 A2 | 11/1997 |
| WO | WO-98/24257 A1 | 6/1998 |
| WO | WO-98/58322 A2 | 12/1998 |
| WO | WO-01/30130 A2 | 5/2001 |
| WO | WO 02/001836 A2 | 1/2002 |
| WO | WO-03/007570 A1 | 1/2003 |
| WO | WO-03/058483 A1 | 7/2003 |
| WO | WO-03/058879 A1 | 7/2003 |
| WO | WO 03/065701 A1 | 8/2003 |
| WO | WO-03/098890 A1 | 11/2003 |
| WO | WO 2004/017591 A2 | 2/2004 |
| WO | WO-2004045171 A1 | 5/2004 |
| WO | WO 2004/047409 A1 | 6/2004 |
| WO | WO-2005/015925 A2 | 2/2005 |
| WO | WO-2005/020108 A1 | 3/2005 |
| WO | WO-2006/045005 A2 | 4/2006 |
| WO | WO-2006/045102 A2 | 4/2006 |
| WO | WO-2006/053952 A1 | 5/2006 |
| WO | WO-2006/053954 A1 | 5/2006 |
| WO | WO-2006/058967 A1 | 6/2006 |
| WO | WO 2007/009252 A1 | 1/2007 |
| WO | WO-2007/015725 A2 | 2/2007 |
| WO | WO-2007/015726 A2 | 2/2007 |
| WO | WO 2007/069245 A2 | 6/2007 |
| WO | WO 2007/073422 A1 | 6/2007 |
| WO | WO 2007/127878 A1 | 11/2007 |
| WO | WO 2007/131914 A1 | 11/2007 |
| WO | WO-2007/149526 A2 | 12/2007 |
| WO | WO-2007/149540 A2 | 12/2007 |
| WO | WO 2008061042 A2 | 5/2008 |
| WO | WO 2008/102265 A2 | 8/2008 |
| WO | WO 2008/134880 A1 | 11/2008 |
| WO | WO 2008/147258 A1 | 12/2008 |
| WO | WO 2009/017712 A1 | 2/2009 |
| WO | WO 2009/132700 A1 | 11/2009 |
| WO | WO 2009/135290 A1 | 11/2009 |
| WO | WO 2009/144688 A2 | 12/2009 |
| WO | WO 2010/035108 A1 | 4/2010 |
| WO | WO 2010/068842 A1 | 6/2010 |
| WO | WO 2010/071345 A2 | 6/2010 |
| WO | WO 2010/076997 A2 | 7/2010 |
| WO | WO 2010/088074 A1 | 8/2010 |
| WO | WO 2011/126889 A2 | 10/2011 |
| WO | WO 2011/158067 A1 | 12/2011 |
| WO | WO 2012/012109 A2 | 1/2012 |
| WO | WO 2012/018430 A1 | 2/2012 |
| WO | WO 2012/018431 A1 | 2/2012 |
| WO | WO 2012/018477 A2 | 2/2012 |
| WO | WO 2012/018479 A2 | 2/2012 |
| WO | WO 2012/018556 A2 | 2/2012 |
| WO | WO 2012/024030 A2 | 2/2012 |
| WO | WO 2012/033593 A1 | 3/2012 |
| WO | WO 2012/051044 A1 | 4/2012 |
| WO | WO 2012/060995 A2 | 5/2012 |
| WO | WO 2012/060996 A2 | 5/2012 |
| WO | WO 2012/060997 A2 | 5/2012 |
| WO | WO 2012/061430 A2 | 5/2012 |
| WO | WO 2012/061433 A2 | 5/2012 |
| WO | WO 2012/061437 A1 | 5/2012 |
| WO | WO 2012/071283 A1 | 5/2012 |
| WO | WO 2012/071384 A2 | 5/2012 |
| WO | WO 2012/094675 A2 | 7/2012 |
| WO | WO 2012/117157 A1 | 9/2012 |
| WO | WO 2012/142884 A1 | 10/2012 |
| WO | WO 2012/145533 A2 | 10/2012 |
| WO | WO 2012/145541 A2 | 10/2012 |
| WO | WO 2012/145544 A2 | 10/2012 |
| WO | WO 2012/149216 A2 | 11/2012 |
| WO | WO 2012/149221 A2 | 11/2012 |
| WO | WO 2012/149434 A2 | 11/2012 |
| WO | WO 2012/149443 A1 | 11/2012 |
| WO | WO 2012/161751 A1 | 11/2012 |
| WO | WO 2013/015835 A1 | 1/2013 |
| WO | WO 2013/015994 A1 | 1/2013 |
| WO | WO 2013/015995 A1 | 1/2013 |
| WO | WO 2013/016663 A2 | 1/2013 |
| WO | WO 2013/016666 A2 | 1/2013 |
| WO | WO 2013/049060 A1 | 4/2013 |
| WO | WO 2013/055413 A1 | 4/2013 |
| WO | WO 2013/066464 A1 | 5/2013 |
| WO | WO 2013/066465 A1 | 5/2013 |
| WO | WO 2013/085590 A1 | 6/2013 |
| WO | WO 2013/085591 A1 | 6/2013 |
| WO | WO 2013/086214 A1 | 6/2013 |
| WO | WO 2013/086225 A1 | 6/2013 |
| WO | WO 2013/086447 A1 | 6/2013 |
| WO | WO 2013/086455 A1 | 6/2013 |
| WO | WO 2013/088186 A1 | 6/2013 |
| WO | WO 2013/090212 A1 | 6/2013 |
| WO | WO 2013/090821 A1 | 6/2013 |
| WO | WO 2013/090834 A1 | 6/2013 |
| WO | WO 2013/103988 A1 | 7/2013 |
| WO | WO 2013/116852 A1 | 8/2013 |
| WO | WO 2013/116856 A1 | 8/2013 |
| WO | WO 2013/154905 A1 | 10/2013 |
| WO | WO 2013/155208 A1 | 10/2013 |
| WO | WO 2013/177390 A1 | 11/2013 |
| WO | WO 2013/187658 A1 | 12/2013 |
| WO | WO 2014/011216 A1 | 1/2014 |

OTHER PUBLICATIONS

ImToo, "Conversion, Backup, Transfer . . . ", Published: Nov. 9, 2005.
International Application No. PCT/US2011/044974, International Search Report, 15 pages, Jun. 1, 2012.
International Application No. PCT/US2011/056474, International Search Report, 9 pages, May 4, 2012.
International Application No. PCT/US2011/056476, International Search Report, 12 pages, May 24, 2012.
International Application No. PCT/US2011/056478, International Search Report, 11 pages, May 31, 2012.
International Application No. PCT/US2011/058840, International Search Report, 10 pages, Apr. 26, 2012.
International Application No. PCT/US2011/058843, International Search Report, 11 pages, May 16, 2012.
International Application No. PCT/US2011/058848, International Search Report, 10 pages, Apr. 10, 2012.
International Application No. PCT/US2011/061512, International Search Report, 10 pages, May 10, 2012.
International Application No. PCT/US2012/021459, International Search Report, 10 pages, Jun. 1, 2012.
International Application No. PCT/US2012/022121, International Search Report, 11 pages, May 14, 2012.
Seven Networks, Inc., "Seven Optimizing the Mobile Ecosystem," www.seven.com/products.traffic_optimization.php, 1 page, May 29, 2012.
Wikipedia, Definition for "General Packet Radio Service," 7 pages, downloaded on May 31, 2012.
Android Developers, "Date," 10 pages, Oct. 27, 2011.

(56) References Cited

OTHER PUBLICATIONS

Braden, R., "Requirements for Internet Hosts—Application and Support," RFC 1123, 80 pages, Oct. 1989.
"CR 3483 to Release 8 TS 25.331, Rev. 2," 3GPP TSG-RAN2 Meeting #64, Prague, Czech Republic, 11 pages, Nov. 10-14, 2008.
"CR 4100 to Release 8 TS 25.331, Rev. 1," 3GPP TSG-RAN WG2 Meeting #69, San Francisco, U.S., 6 pages, Feb. 22-26, 2010.
Elz, R. et al., "Clarifications to the DNS Specification," RFC 2181, 12 pages, Jul. 1997.
European Patent Application No. EP 05815115.0, Supplementary European Search Report, 7 pages, Nov. 17, 2011.
GSM Association, "Network Efficiency Task Force Fast Dormancy Best Practices," V1.0, 21 pages, May 26, 2010.
International Application No. PCT/US2005/038135, International Preliminary Report on Patentability, 9 pages, Oct. 31, 2011.
International Application No. PCT/US2011/030534, International Search Report, 10 pages, Dec. 29, 2011.
International Application No. PCT/US2011/037932, International Search Report, 9 pages, Jan. 2, 2012.
International Application No. PCT/US2011/037943, International Search Report, 11 pages, Jan. 2, 2012.
International Application No. PCT/US2011/043322, International Search Report, 9 pages, Feb. 9, 2012.
International Application No. PCT/US2011/043328, International Search Report, 12 pages, Feb. 27, 2012.
International Application No. PCT/US2011/043409, International Search Report, 11 pages, Feb. 9, 2012.
Mockapetris, P., "Domain Names—Concepts and Facilities," RFC 1034, 43 pages, Nov. 1987.
Mockapetris, P., "Domain Names—Implementation and Specification," RFC 1035, 43 pages, Nov. 1987.
Perez, Sarah, "Onavo's Data-Compressing Mobile App Raises $10 Million Series B From Horizons, Motorola Ventures," 2 pages, Jan. 24, 2012.
Qualcomm Incorporated, "Managing Background Data Traffic in Mobile Devices," 16 pages, Jan. 2012.
Qualcomm, "System Parameter Recommendations to Optimize PS Data User Experience and UE Battery Life," 80-W1112-1, Revision B, 9 pages, Mar. 2007.
Gameline, Advertisement, 1 page, 1982.
ImTOO, "ImTOO iPod Movie Converter," 3 pages, Nov. 9, 2005.
Allchin, James Edward, "An Architecture for Reliable Decentralized Systems," Ph.D. Thesis, Georgia Institute of Technology, 185 pages, Sep. 1983.
Augun, Audrey, "Integrating Lotus Notes With Enterprise Data," Lotus Notes Advisory, pp. 22-25, Jul.-Aug. 1996.
Balaban, Bob, "This is Not Your Father's Basic: LotusScript in Notes Release 4," The View, vol. 1, Issue 5, 32 pages, Nov.-Dec. 1995.
Bedell, Doug, "Meeting Your New Best Friends Six Degrees Widens Your Contacts in Exchange for Sampling Web Sites," The Dallas Morning News, 4 pages, Oct. 27, 1998.
Bergman, Lawrence D. et al., "Programming-By-Demonstration for Behavior-Based User Interface Customization," IBM Research Report, RC23116, 5 pages, Feb. 20, 2004.
B'Far, Reza et al., "Designing Effective User Interfaces for Wireless Devices," Publication Unknown, 14 pages, Date Unknown—published prior to Feb. 23, 2006.
Blaney, Jeff, "You Can Take it With You—An Introduction to Mobile Computing With Notes R4," The View, vol. 2, Issue 1, 14 pages, Jan.-Feb. 1996.
Brown, Kevin et al., "Mastering Lotus Notes®," Sybex Inc., 996 pages, 1995.
"Chapter: About NotesPump," Publication Unknown, 480 pages, Date Unknown—published prior to Jan. 8, 2003.
"Chapter 13-1—Anatomy of a Note ID," Publication Unknown, 8 pages, Date Unknown—published prior to Jan. 8, 2003.
Cole, Barb et al., "Lotus Airs Notes-To-Database Integration Tool," Network World, 2 pages, Oct. 2, 1995.
Dahl, Andrew, "Lotus Notes® 4 Administrator's Survival Guide," Sams Publishing, 64 pages, 1996.
Decker, Stefan et al., "The Social Semantic Desktop," Digital Enterprise Research Institute, DERI Technical Report May 2, 2004, 7 pages, May 2004.
European Patent Application No. EP 03705704.9, Supplementary European Search Report, 4 pages, Jun. 9, 2010.
European Patent Application No. EP 03707338.4, Supplementary European Search Report, 2 pages, Apr. 18, 2011.
Falkner, Mike, "How to Plan, Develop, and Implement Lotus Notes® in Your Organization," John Wiley & Sons, Inc., 539 pages, 1996.
Freeland, Pat et al., "Lotus Notes 3-3.1 for Dummies™," IDG Books Worldwide, 389 pages, 1994.
Frenkel, Garry, "Pumping for Info: Notes and Database Integration," Network Computing, 10 pages, May 1, 1996.
Gewirtz, David, "Lotus Notes 3 Revealed!," Prima Publishing, 261 pages, 1994.
Grous, Paul J., "Creating and Managing a Web Site With Lotus Internotes Web Publisher," The View, vol. 1, Issue 4, 20 pages, Sep.-Oct. 1995.
Haas, Zygmunt J. et al., "Mobile-TCP: An Asymmetric Transport Protocol Design for Mobile Systems," IEEE, pp. 1054-1058, 1997.
Haas, Zygmunt J. et al., "The Design and Performance of Mobile TCP for Wireless Networks," Journal of High Speed Networks, vol. 10, pp. 187-207, 2001.
Hajdu, Kalman et al., "Lotus Notes Release 4 in a Multiplatform Environment," IBM Corporation, 173 pages, Feb. 1996.
Hardy, Ed, "Microsoft Proposes Two New Thumb-Driven User Interfaces," Brighthand Consulting, Inc., 2 pages, 2003.
IBM Corporation, "The Architecture of Lotus Notes," White Paper No. 114654, 26 pages, May 31, 1995.
IBM Corporation, "The History of Notes and Domino," Lotus Developer Domain, 11 pages, Sep. 29, 2003.
IntelliLink Corporation, "IntelliLink® for Windows User's Guide," Version 3.0, 167 pages, 1994.
International Application No. PCT/US2003/000618, International Search Report, 1 page, Apr. 4, 2003.
International Application No. PCT/US2003/000624, International Search Report, 2 pages, May 13, 2003.
International Application No. PCT/US2005/037702, International Preliminary Examination Report, 6 pages, Nov. 20, 2007.
International Application No. PCT/US2005/037702, International Search Report, 1 page, Nov. 5, 2007.
International Application No. PCT/US2005/037702, Written Opinion, 6 pages, Nov. 5, 2007.
International Application No. PCT/US2005/038135, International Search Report, 2 pages, Aug. 8, 2008.
International Application No. PCT/US2005/038135, Written Opinion, 8 pages, Aug. 8, 2008.
International Application No. PCT/FI2005/050424, International Search Report, 4 pages, Mar. 2, 2006.
International Application No. PCT/FI2005/050426, International Search Report, 3 pages, Mar. 1, 2006.
International Application No. PCT/FI2005/050441, International Search Report, 3 pages, Mar. 1, 2006.
International Application No. PCT/US2006/023426, International Search Report, 1 page, Feb. 21, 2007.
International Application No. PCT/US2006/023427, International Search Report, 1 page, Oct. 12, 2006.
International Application No. PCT/US2007/014462, International Search Report, 1 page, Jul. 2, 2008.
International Application No. PCT/US2007/014497, International Search Report, 1 page, Aug. 25, 2008.
Japanese Patent Application No. 2003-558726, Office Action, 2 pages, Jun. 10, 2008.
Karlson, Amy K. et al., "AppLens and LaunchTile: Two Designs for One-Handed Thumb Use on Small Devices," Proceedings of CHI 2005, 10 pages, Apr. 2-7, 2005.
Kent, S. et al., "Security Architecture for the Internet Protocol," RFC 2401, The Internet Society, 62 pages, Nov. 1998.
Kleinberg, Jon, "The Small-World Phenomenon: An Algorithmic Perspective," Cornell Computer Science Technical Report 99-1776, 14 pages, Oct. 1999.
Koeppel, Dan, "GUIs Just Want to Have Fun," Wired Magazine, Issue 8.10, 12 pages, Oct. 2000.

(56) References Cited

OTHER PUBLICATIONS

Kornblith, Polly Russell, "Lotus Notes Answers: Certified Tech Support," Covers Release 3, McGraw-Hill, Inc., 326 pages, 1994.
Kreisle, Bill, "Teach Yourself . . . Lotus Notes 4," MIS Press, 464 pages, 1996.
Lamb, John P. et al., "Lotus Notes Network Design," McGraw-Hill, 278 pages, 1996.
Londergan, Stephen et al., "Lotus Notes® Release 4 for Dummies®," IDG Books Worldwide, 229 pages, 1996.
Lotus Development Corporation, "Firewall Security Overview and How Firewalls Relate to Lotus Notes," Lotus Notes Knowledge Base, 9 pages, May 22, 1996.
Lotus Development Corporation, "How to Set Up 'Firewall' Protection for a Notes Domain," Lotus Notes Knowledge Base, 2 pages, Nov. 6, 1995.
Lotus Development Corporation, "Lotus Announces Lotus NotesPump 1.0," Lotus Notes Knowledge Base, 6 pages, Oct. 31, 1995.
Lotus Development Corporation, "Lotus Inside Notes—The Architecture of Notes and The Domino Server," 207 pages, 2000.
Lotus Development Corporation, "Lotus NotesPump 1.0 Q & A," Lotus Notes Knowledge Base, 3 pages, Oct. 31, 1995.
Lotus Development Corporation, "Lotus NotesPump: Database Integration for Lotus Notes," Lotus Notes Knowledge Base, 5 pages, Oct. 31, 1995.
Lotus Development Corporation, "Lotus Notes Administration," Release 3.3, 20 pages, 1995.
Lotus Development Corporation, "Lotus Notes Administrator's Guide," Release 4, 499 pages, 1995.
Lotus Development Corporation, "Lotus Notes Administrators Guide—Server for NetWare, OS-2, and Unix," Release 3.1, 509 pages, 1994.
Lotus Development Corporation, "Lotus Notes Administrators Guide—Server for Windows," Release 3.1, 345 pages, 1994.
Lotus Development Corporation, "Lotus Notes Application Developer's Guide," Release 4, 475 pages, 1995.
Lotus Development Corporation, "Lotus Notes Customer Service Application Guide," Release 3.1, 46 pages, 1994.
Lotus Development Corporation, "Lotus Notes Customer Support Guide," 33 pages, Date Unknown—published prior to Jan. 8, 2003.
Lotus Development Corporation, "Lotus Notes Customer Support Guide—North American Guide," Release 4.1, 51 pages, Date Unknown—published prior to Jan. 8, 2003.
Lotus Development Corporation, "Lotus Notes Database Manager's Guide," Release 4, 115 pages, 1995.
Lotus Development Corporation, "Lotus Notes Deployment Guide," Release 4, 104 pages, 1995.
Lotus Development Corporation, "Lotus Notes for Windows, OS-2, and Macintosh," Release 3.3, 89 pages, 1995.
Lotus Development Corporation, "Lotus Notes Getting Started With Application Development," Release 3.1, 151 pages, 1994.
Lotus Development Corporation, "Lotus Notes Install Guide for Servers," Release 4, 68 pages, 1996.
Lotus Development Corporation, "Lotus Notes Install Guide for Workstations," Release 4, 28 pages, 1995.
Lotus Development Corporation, "Lotus Notes Install Guide for Workstations," Release 4.1, 67 pages, 1996.
Lotus Development Corporation, "Lotus Notes Install Guide for Workstations," Release 4.5, 81 pages, 1996.
Lotus Development Corporation, "Lotus Notes Internet Cookbook for Notes Release 3," 21 pages, Jan. 16, 1996.
Lotus Development Corporation, "Lotus Notes Internet Cookbook for Notes Release 4," 35 pages, Feb. 14, 1996.
Lotus Development Corporation, "Lotus Notes Internotes Web Navigator Administrator's Guide," Release 4, 60 pages, 1995.
Lotus Development Corporation, "Lotus Notes Internotes Web Navigator User's Guide," Release 4, 56 pages, 1995.
Lotus Development Corporation, "Lotus Notes Internotes Web Publisher Guide," Release 4, 122 pages, 1996.
Lotus Development Corporation, "Lotus Notes LotusScript Classes for Notes," Release 4, 6 pages, Date Unknown—published prior to Jan. 8, 2003.
Lotus Development Corporation, "Lotus Notes Migration Guide," Release 4, 110 pages, 1996.
Lotus Development Corporation, "Lotus Notes Network Configuration Guide," Release 4.5, 121 pages, 1996.
Lotus Development Corporation, "Lotus Notes Network Driver Documentation," Release 3.1, 100 pages, 1994.
Lotus Development Corporation, "Lotus Notes Programmer's Guide—Part 1," Release 4, 614 pages, 1995.
Lotus Development Corporation, "Lotus Notes Programmer's Guide—Part 2," Release 4, 462 pages, 1995.
Lotus Development Corporation, "Lotus Notes Quick Reference for Application Developers," Release 3, 6 pages, Date Unknown—published prior to Jan. 8, 2003.
Lotus Development Corporation, "Lotus Notes Quick Reference for Macintosh," Release 3, 6 pages, Date Unknown—published prior to Jan. 8, 2003.
Lotus Development Corporation, "Lotus Notes Quick Reference for SmartIcons," Release 3.1, 4 pages, Date Unknown—published prior to Jan. 8, 2003.
Lotus Development Corporation, "Lotus Notes Quick Reference for Windows and Presentation Manager," Release 3, 6 pages, Date Unknown—published prior to Jan. 8, 2003.
Lotus Development Corporation, "Lotus Notes Release Notes," Release 4, 139 pages, 1995.
Lotus Development Corporation, "Lotus Notes Release Notes," Release 4.1, 197 pages, 1996.
Lotus Development Corporation, "Lotus Notes Server for Windows," Release 3.3, 7 pages, 1994.
Lotus Development Corporation, "Lotus Notes Server Up and Running!," Release 4, 13 pages, 1996.
Lotus Development Corporation, "Lotus Notes Site and Systems Planning Guide," Release 3.1, 169 pages, 1994.
Lotus Development Corporation, "Lotus Notes Start Here—Workstation Install for Windows, OS-2 and Macintosh," Release 3.3, 47 pages, 1995.
Lotus Development Corporation, "Lotus Notes Step by Step—A Beginner's Guide to Lotus Notes," Release 4, 179 pages, 1995.
Lotus Development Corporation, "Lotus Notes Step by Step—A Beginner's Guide to Lotus Notes," Release 4.1, 167 pages, 1996.
Lotus Development Corporation, "Lotus Software Agreement," 8 pages, Date Unknown—published prior to Jan. 8, 2003.
Lotus Development Corporation, "What is the Notes Replicator?," Lotus Notes Knowledge Base, 8 pages, Jul. 5, 1995.
"Lotus Notes Advisor," Advisor Publications Inc., 55 pages. Jun. 1995.
"Lotus Notes Advisor," Advisor Publications Inc., 55 pages, Aug. 1995.
"Lotus Notes Advisor," Advisor Publications Inc., 55 pages, Oct. 1995.
"Lotus Notes Advisor," Advisor Publications Inc., 55 pages, Dec. 1995.
"Lotus Notes Advisor," Advisor Publications Inc., 63 pages, Jan.-Feb. 1996.
"Lotus Notes Advisor," Advisor Publications Inc., 55 pages, Apr. 1996.
"Lotus Notes Advisor," Advisor Publications Inc., 55 pages, Jun. 1996.
"Lotus Notes Advisor," Advisor Publications Inc., 55 pages, Aug. 1996.
"Lotus Notes Advisor," Advisor Publications Inc., 55 pages, Oct. 1996.
"Lotus Notes Advisor," Advisor Publications Inc., 63 pages, Dec. 1996.
"Lotus Notes—Notes Administration Help," Screen Shots, 17 pages, Date Unknown—published prior to Jan. 8, 2003.
MacGregor, Rob et al., "The Domino Defense: Security in Lotus Notes and The Internet," IBM Corporation, 183 pages, Dec. 1997.
Maltz, David A. et al., "MSOCKS: An Architecture for Transport Layer Mobility," IEEE, pp. 1037-1045, 1998.

(56) References Cited

OTHER PUBLICATIONS

Marmel, Elaine, "Easy Lotus® Notes Release 4.0," Que Corporation, 237 pages, 1996.
Mason, Luke, "Windows XP: New GUI Design Shows Skin is In," TechRepublic, 4 pages, Apr. 4, 2001.
McMullen, Melanie, "Network Remote Access and Mobile Computing," Miller Freeman Inc., 226 pages, 1994.
Microsoft, Definition of "Access," Microsoft Computer Dictionary, Fifth Edition, 2 pages, May 1, 2002.
Microsoft, Definition of "Synchronization," Microsoft Computer Dictionary, Fifth Edition, 2 pages, May 1, 2002.
Milgram, Stanley, "The Small-World Problem," Psychology Today, vol. 2, pp. 60-67, 1967.
Miller, Victor S., "Use of Elliptic Curves in Cryptography," Advances in Cryptology—CRYPTO '85 Proceedings, vol. 218, pp. 417-426, 1985.
Myers, Brad A. et al., "Extending the Windows Desktop Interface With Connected Handheld Computers," WSS'00 Proceedings of the 4th Conference on USENIX Windows Systems Symposium, vol. 4, 10 pages, 2000.
Myers, Brad A. et al., "User Interfaces That Span Hand-Held and Fixed Devices," CHI'2001 Workshop on Distributed and Disappearing User Interfaces in Ubiquitous Computer, 4 pages, 2001.
National Institute of Standards and Technology, "Advanced Encryption Standard (AES)," Federal Information Processing Standards Publication 197, 52 pages, Nov. 26, 2001.
National Institute of Standards and Technology, "Secure Hash Standard," Federal Information Processing Standards Publication 180-2, 83 pages, Aug. 1, 2002.
Netscape Communications Corporation, "Netscape Mail Server Administrator's Guide," Version 2.0, 172 pages, 1996.
Netscape Communications Corporation, "Netscape Mail Server Installation Guide," Version 2.0 for Unix, 62 pages, 1996.
Netscape Communications Corporation, "Netscape Mail Server User's Guide," Version 2.0, 35 pages, 1996.
Netscape Communications Corporation, "Netscape News Server Administrator's Guide for Windows NT," Version 2.0, 119 pages, 1996.
Niederée, Claudia et al., "A Multi-Dimensional, Unified User Model for Cross-System Personalization," Proceedings of the AVI 2004 Workshop on Environments for Personalized Information Access, 11 pages, 2004.
Nokia, "Developer Platforms," 3 pages, 2005.
"NotesPump 1.0 Release Notes," Publication Unknown, 8 pages, Date Unknown—published prior to Jan. 8, 2003.
Opyt, Barbara et al., "Use the Internet as Your Lotus Notes WAN," Lotus Notes Advisor, pp. 17-20, Nov.-Dec. 1996.
Ortiz, C. Enrique, "An Introduction to the Symbian OS™ Platform for Palm OS® Developers," Metrowerks Corp., 21 pages, 2002.
"Overview—What is Lotus NotesPump?," Publication Unknown, 88 pages, Date Unknown—published prior to Jan. 8, 2003.
Phillips, Joshua et al., "Modeling the Intelligence Analysis Process for Intelligent User Agent Development," Research and Practice in Human Resource Management, vol. 9, No. 1, pp. 59-73, 2001.
Pyle, Hugh, "The Architecture of Lotus Notes," Lotus Notes Advisor, Premiere Issue, pp. 18-27, 1995.
Pyle, Lisa, "A Jump Start to the Top Ten R3-To-R4 Migration Considerations," The View, vol. 1, Issue 5, 22 pages, Nov.-Dec. 1995.
Ringel, Meredith et al., "iStuff: A Scalable Architecture for Lightweight, Wireless Devices for Ubicomp User Interfaces," Proceedings of UbiComp 2002, 2 pages, 2002.
Shafran, Andrew Bryce, "Easy Lotus Notes® for Windows™," Que Corporation, 199 pages, 1994.
Signorini, Eugene, "Seven's Service-Based Wireless Solutions Enable Enterprises to Untether E-Mail," Wireless/Mobile Enterprise & Commerce, 16 pages, Oct. 2004.
Swedeen, Bret et al., "Under the Microscope—Domino Replication," LDD Today, 8 pages, Oct. 1, 1998.
Tamura, Randall A., "Lotus® Notes™ 4 Unleashed," Sams Publishing, 928 pages, 1996.

U.S. Appl. No. 60/663,463, File History, 113 pages, Mar. 18, 2005.
Vivacqua, Adriana et al., "Profiling and Matchmaking Strategies in Support of Opportunistic Collaboration," CoopIS/DOA/ODBASE 2003, LNCS 2888, pp. 162-177, 2003.
Wainwright, Andrew, "Secrets to Running Lotus Notes: The Decisions No One Tells You How to Make," IBM Corporation, 193 pages, Oct. 1996.
Wilcox, Adam A., "PC Learning Labs Teaches Lotus Notes 3.0," Ziff-Davis Press, 381 pages, 1993.
Wong, Harry, "Casahl's Replic-Action: Delivering True Notes-DBMS Integration," The View, vol. 2, Issue 1, pp. 33-50, Jan.-Feb. 1996.
Adwankar, Sandeep et al., "Universal Manager: Seamless Management of Enterprise Mobile and Non-Mobile Devices," Proceedings of the 2004 IEEE International Conference on Mobile Data Management, 12 pages, 2004.
Amato, Guiseppe et al., "Detection of Images With Adult Content for Parental Control on Mobile Devices," Mobility, 5 pages, 2009.
Ankeny, Jason, "F-Secure: Android to Blame for 79% of All Mobile Malware in 2012," FierceMobileContent, FierceMarkets, 3 pages, Mar. 7, 2013.
Armstrong, Trevor et al., "Efficient and Transparent Dynamic Content Updates for Mobile Clients," The Fourth International Conference on Mobile Systems, Applications and Services, MobiSys 2006, pp. 56-68, Jun. 19-22, 2006.
Baset, Salman et al., "An Analysis of the Skype Peer-To-Peer Internet Telephony Protocol," Columbia University, Department of Computer Science, 12 pages, Sep. 15, 2004.
Blefari-Melazzi, N. et al., "Autonomic Control and Personalization of a Wireless Access Network," Computer Networks, vol. 51, pp. 2645-2676, 2007.
Canadian Patent Application No. 2,798,523, Office Action, 5 pages, Sep. 30, 2013.
Canadian Patent Application No. 2,806,527, Office Action, 4 pages, Apr. 3, 2013.
Canadian Patent Application No. 2,806,527, Office Action, 8 pages, Aug. 8, 2013.
Canadian Patent Application No. 2,806,529, Office Action, 4 pages, Apr. 2, 2013.
Canadian Patent Application No. 2,806,529, Office Action, 6 pages, Aug. 8, 2013.
Canadian Patent Application No. 2,806,548, Office Action, 4 pages, Oct. 10, 2013.
Canadian Patent Application No. 2,806,548, Office Action, 3 pages, Feb. 25, 2014.
Canadian Patent Application No. 2,806,549, Office Action, 2 pages, Jul. 23, 2013.
Canadian Patent Application No. 2,806,549, Office Action, 3 pages, Nov. 4, 2013.
Canadian Patent Application No. 2,806,549, Office Action, 3 pages, Feb. 18, 2014.
Canadian Patent Application No. 2,806,550, Office Action, 3 pages, May 23, 2013.
Canadian Patent Application No. 2,806,550, Office Action, 3 pages, Oct. 1, 2013.
Canadian Patent Application No. 2,806,550, Office Action, 3 pages, Feb. 14, 2014.
Canadian Patent Application No. 2,806,557, Office Action, 4 pages, Mar. 21, 2013.
Canadian Patent Application No. 2,806,557, Office Action, 4 pages, Jul. 18, 2013.
Canadian Patent Application No. 2,806,557, Office Action, 6 pages, Nov. 15, 2013.
de la Iglesia, Didac Gil et al., "Enhancing Mobile Learning Activities by the Use of Mobile Virtual Devices—Some Design and Implementation Issues," 2010 International Conference on Intelligent Networking and Collaborative Systems, IEEE Computer Society, pp. 137-144, 2010.
Eronen, "TCP Wake-Up: Reducing Keep-Alive Traffic in Mobile IPv4 and Ipsec NAT Traversal," NRC-TR-2008-002, Nokia, 10 pages, Jan. 31, 2008.
European Patent Application No. EP 11748780.1, Examination Report, 4 pages, Jan. 17, 2014.

(56) References Cited

OTHER PUBLICATIONS

European Patent Application No. EP 11814939.2, Supplementary European Search Report, 6 pages, Nov. 6, 2013.
European Patent Application No. EP 11814940.0, Supplementary European Search Report, 7 pages, Nov. 7, 2013.
European Patent Application No. EP 11814971.5, Supplementary European Search Report, 10 pages, Oct. 24, 2013.
European Patent Application No. EP 11814971.5, Examination Report, 4 pages, Feb. 17, 2014.
European Patent Application No. EP 11814973.1, Supplementary European Search Report, 10 pages, Oct. 30, 2013.
European Patent Application No. EP 11814973.1, Examination Report, 4 pages, Feb. 17, 2014.
European Patent Application No. EP 11838437.9, Supplementary European Search Report, 7 pages, Dec. 18, 2013.
European Patent Application No. EP 11838437.9, Examination Report, 2 pages, Feb. 19, 2014.
European Patent Application No. EP 11838705.9, Supplementary European Search Report, 6 pages, Dec. 12, 2013.
European Patent Application No. EP 11842623.8, Supplementary European Search Report, 7 pages, Jan. 16, 2014.
European Patent Application No. EP 11843111.3, Supplementary European Search Report, 6 pages, Oct. 21, 2013.
European Patent Application No. EP 11843111.3, Examination Report, 4 pages, Feb. 17, 2014.
European Patent Application No. EP 12732122.2, Supplementary European Search Report, 6 pages, Dec. 6, 2013.
European Patent Application No. EP 12775986.8, Supplementary European Search Report, 6 pages, Jul. 2, 2013.
European Patent Application No. EP 13150313.8, Examination Report, 5 pages, Jul. 19, 2013.
European Patent Application No. EP 13150313.8, Supplementary European Search Report, 3 pages, Jul. 2, 2013.
Fukushima, Yukinobu et al., "Planning Method of Robust WDM Networks Against Traffic Changes," IEIC Technical Report, vol. 103, No. 1, pp. 11-16, 2003.
International Application No. PCT/US2011/061795, International Search Report & Written Opinion, 10 pages, Jul. 31, 2012.
International Application No. PCT/US2012/020669, International Search Report & Written Opinion, 10 pages, Sep. 12, 2012.
International Application No. PCT/US2012/034288, International Search Report & Written Opinion, 15 pages, Nov. 23, 2012.
International Application No. PCT/US2012/034297, International Search Report & Written Opinion, 11 pages, Nov. 26, 2012.
International Application No. PCT/US2012/034300, International Search Report & Written Opinion, 9 pages, Nov. 23, 2012.
International Application No. PCT/US2012/035292, International Search Report & Written Opinion, 11 pages, Nov. 28, 2012.
International Application No. PCT/US2012/035300, International Search Report & Written Opinion, 9 pages, Nov. 28, 2012.
International Application No. PCT/US2012/035608, International Search Report & Written Opinion, 9 pages, Nov. 28, 2012.
International Application No. PCT/US2012/035617, International Search Report & Written Opinion, 9 pages, Oct. 10, 2012.
International Application No. PCT/US2012/042982, International Search Report & Written Opinion, 11 pages, Jan. 2, 2013.
International Application No. PCT/US2012/046317, International Search Report & Written Opinion, 10 pages, Jan. 3, 2013.
International Application No. PCT/US2012/046321, International Search Report & Written Opinion, 11 pages, Dec. 27, 2012.
International Application No. PCT/US2012/048623, International Search Report & Written Opinion, 13 pages, Jan. 31, 2013.
International Application No. PCT/US2012/048639, International Search Report & Written Opinion, 15 pages, Jan. 29, 2013.
International Application No. PCT/US2012/050467, International Search Report & Written Opinion, 14 pages, Mar. 4, 2013.
International Application No. PCT/US2012/050476, International Search Report & Written Opinion, 14 pages, Feb. 28, 2013.
International Application No. PCT/US2012/055931, International Search Report & Written Opinion, 9 pages, Mar. 4, 2013.
International Application No. PCT/US2012/055934, International Search Report & Written Opinion, 12 pages, Jan. 31, 2013.
International Application No. PCT/US2012/068278, International Search Report & Written Opinion, 11 pages, Mar. 21, 2013.
International Application No. PCT/US2012/068291, International Search Report & Written Opinion, 10 pages, Mar. 21, 2013.
International Application No. PCT/US2012/068612, International Search Report & Written Opinion, 10 pages, Mar. 29, 2013.
International Application No. PCT/US2012/068624, International Search Report & Written Opinion, 10 pages, Mar. 25, 2013.
International Application No. PCT/US2012/068822, International Search Report & Written Opinion, 13 pages, Mar. 29, 2013.
International Application No. PCT/US2012/069917, International Search Report & Written Opinion, 14 pages, Apr. 30, 2013.
International Application No. PCT/US2012/069931, International Search Report & Written Opinion, 10 pages, Apr. 30, 2013.
International Application No. PCT/US2013/020574, International Search Report & Written Opinion, 9 pages, Mar. 4, 2013.
International Application No. PCT/US2013/024657, International Search Report & Written Opinion, 14 pages, May 30, 2013.
International Application No. PCT/US2013/024664, International Search Report & Written Opinion, 11 pages, Apr. 1, 2013.
International Application No. PCT/US2013/027694, International Search Report & Written Opinion, 12 pages, Jun. 4, 2013.
International Application No. PCT/US2013/035257, International Search Report & Written Opinion, 14 pages, Jul. 26, 2013.
International Application No. PCT/US2013/036013, International Search Report & Written Opinion, 16 pages, Jul. 26, 2013.
International Application No. PCT/US2013/042417, International Search Report & Written Opinion, 19 pages, Sep. 13, 2013.
International Application No. PCT/US2013/061488, International Search Report & Written Opinion, 14 pages, Apr. 16, 2014.
International Application No. PCT/US2013/070360, International Search Report & Written Opinion, 13 pages, Feb. 28, 2014.
Japanese Patent Application No. 2013-521779, Office Action, 8 pages, Feb. 13, 2014.
Japanese Patent Application No. 2013-521801, Office Action, 6 pages, Feb. 3, 2014.
Japanese Patent Application No. 2013-521845, Office Action, 6 pages, Dec. 18, 2013.
Johnsen, Lotte, Master's Thesis for "Content Distribution in Ad Hoc Networks," Norwegian University of Science and Technology, Department of Telematics, 158 pages, Spring 2006.
Kanter, Theo et al., "Smart Delivery of Multimedia Content for Wireless Applications," Computer Science, vol. 1818, pp. 70-81, 2000.
Kino, Toru, "Infrastructure Technology for Cloud Services," Fujitsu Sci. Tech. J., vol. 47, No. 4, pp. 434-442, Oct. 2011.
LeBrun, Jason et al., "Bluetooth Content Distribution Stations on Public Transit," ACM, Inc., 3 pages, 2006.
Newton, Harry, "Newton's Telecom Dictionary," 20th Edition, pp. 2 cover, 67, 127, 542, Mar. 2004.
Open Mobile Alliance Ltd., "OMA AOI Architecture Principles—OMA-CD-AOI-2012-0012," 12 pages, Dec. 17, 2012.
Openet Telecom, "Taming Signaling: Addressing the Signaling Storm," Openet Labs Technical White Paper, 11 pages, 2012.
Parker, Tammy, "SK Telecom Aims to License, Standardize Smart Push," FierceBroadbandWireless, 4 pages, Aug. 26, 2012.
Paul, Sanjoy et al., "The Cache-And-Forward Network Architecture for Efficient Mobile Content Delivery Services in the Future Internet," First ITU-T Kaleidoscope Academic Conference for Innovations in NGN—Future Network and Services, 7 pages, May 12-13, 2008.
Pei, Guangyu et al., "Mobility Management in Hierarchical Multi-Hop Mobile Wireless Networks," IEEE, pp. 324-329, 1999.
Qualcomm Incorporated, "A 3G/LTE Wi-Fi Offload Framework: Connectivity Engine (CnE) to Manage Inter-System Radio Connections and Applications," 15 pages, Jun. 2011.
Sung, Dan Keun, Ph.D., "EE624 Mobile Communications Systems (MCS)," Korea Advanced Institute of Science and Technology, Department of Electrical Engineering and Computer Science, 13 pages, Fall 2000.

(56) References Cited

OTHER PUBLICATIONS

U.K. Patent Application No. GB1219986.5, Examination Report, 6 pages, Dec. 24, 2012.
U.K. Patent Application No. GB1222083.6, Search Report, 4 pages, Apr. 30, 2013.
U.K. Patent Application No. GB1222636.1, Search Report, 4 pages, May 30, 2013.
U.K. Patent Application No. GB1222637.9, Search Report, 4 pages, Sep. 13, 2013.
U.K. Patent Application No. GB1222637.9, Search Report, 5 pages, Apr. 15, 2014.
U.K. Patent Application No. GB1300185.4, Examination Report, 10 pages, Oct. 29, 2013.
U.K. Patent Application No. GB1300808.1, Examination Report, 10 pages, Mar. 11, 2013.
U.K. Patent Application No. GB1300808.1, Examination Report, 3 pages, Sep. 20, 2013.
U.K. Patent Application No. GB1300808.1, Examination Report, 4 pages, Feb. 3, 2014.
U.K. Patent Application No. GB1301235.6, Examination Report, 3 pages, Jun. 24, 2013.
U.K. Patent Application No. GB1301258.8, Examination Report, 5 pages, Feb. 18, 2013.
U.K. Patent Application No. GB1301271.1, Examination Report, 4 pages, Mar. 14, 2013.
U.K. Patent Application No. GB1302153.0, Examination Report, 3 pages, Nov. 20, 2013.
U.K. Patent Application No. GB1302158.9, Examination Report, 7 pages, Mar. 15, 2013.
U.K. Patent Application No. GB1302515.0, Examination Report, 3 pages, Mar. 5, 2013.
U.K. Patent Application No. GB1306198.1, Examination Report, 4 pages, Oct. 14, 2013.
U.K. Patent Application No. GB1307218.6, Examination Report, 5 pages, Jun. 24, 2013.
U.K. Patent Application No. GB1307573.4, Examination Report, 4 pages, Jul. 3, 2013.
U.K. Patent Application No. GB1307573.4, Examination Report, 4 pages, Nov. 12, 2013.
U.K. Patent Application No. GB1309204.4, Examination Report, 6 pages, Jun. 25, 2013.
U.K. Patent Application No. GB1309366.1, Search Report, 4 pages, Nov. 27, 2013.
U.K. Patent Application No. GB1309373.7, Examination Report, 6 pages, Jun. 26, 2013.
U.K. Patent Application No. GB1309373.7, Examination Report, 3 pages, Dec. 5, 2013.
U.K. Patent Application No. GB1310340.3, Examination Report, 8 pages, Jul. 10, 2013.
U.K. Patent Application No. GB1310340.3, Examination Report, 6 pages, Jan. 31, 2014.
U.K. Patent Application No. GB1310348.6, Examination Report, 5 pages, Jul. 15, 2013.
U.K. Patent Application No. GB1316847.1, Examination Report, 7 pages, Nov. 12, 2013.
U.K. Patent Application No. GB1317828.0, Examination Report, 7 pages, Jan. 3, 2014.
U.K. Patent Application No. GB1317972.6, Examination Report, 8 pages, Dec. 9, 2013.
U.K. Patent Application No. GB1318437.9, Examination Report, 7 pages, Feb. 6, 2014.
U.K. Patent Application No. GB1318796.8, Examination Report, 7 pages, Dec. 5, 2013.
U.K. Patent Application No. GB1318908.9, Examination Report, 6 pages, Nov. 29, 2013.
U.K. Patent Application No. GB1319222.4, Examination Report, 6 pages, Dec. 12, 2013.
U.K. Patent Application No. GB1319283.6, Examination Report, 7 pages, Nov. 21, 2013.
U.K. Patent Application No. GB1320293.2, Examination Report, 3 pages, Jan. 23, 2014.
U.K. Patent Application No. GB1321790.6, Examination Report, 6 pages, Jan. 17, 2014.
U.K. Patent Application No. GB1400632.4, Combined Search and Examination Report, 5 pages, Feb. 19, 2014.
Yin, Chunjiang et al., "IST-2001-32125 Flows," Deliverable No. D15, Information Society Technologies, 97 pages, Dec. 22, 2003.
Zhang, Qi et al., "Cloud Computing: State-Of-The-Art and Research Challenges," J Internet Sery Appl, vol. 1, pp. 7-18, 2010.

* cited by examiner

POLICY BASED CONTENT SERVICE

CROSS-REFERENCE TO RELATED APPLICATIONS

This application is related to U.S. patent application Ser. No. 12/002,300 entitled "Content Delivery to a Mobile Device from a Content Service" filed on Dec. 13, 2007 and U.S. patent application Ser. No. 12/008,710 entitled "Mobile Virtual Network Operator" filed on Jan. 11, 2008. The disclosure of each co-pending application is incorporated herein by reference.

BACKGROUND

1. Field of the Invention

The present invention relates generally to the field of wireless mobile device network services. More specifically, the present invention relates to serving user selected content in accordance with an enforcement policy.

2. Description of Related Art

The Internet allows users to access data remotely through a computer. Traditionally, the computer has been a desktop unit or laptop. Mobile devices now have the computing power to access data remotely and effectively function as a desktop or laptop.

Notwithstanding, there are numerous issues related to serving content to mobile devices. Each mobile device will have varying capabilities such as resident software applications, screen size, memory capacity, and processing power. Additionally, there are many preferences that a user may have or be subject to that when incorporated into the content serving process, limit the ability to serve content.

Effectively managing mobile device capabilities and user preferences would provide improved and enhanced content access on a mobile device.

SUMMARY

A system for policy based content delivery includes a mobile device, a content source, and a content server. The mobile device selects and receives content. The content source provides content selected by the mobile device to the content server. The content source modifies content selected by the mobile device prior to providing the selected content to the mobile device. The content server detects content at the content source. The content server provides a list of detected content to the mobile device for selection by the user. The content server instructs the content source to provide the content in a manner that is in accordance with a policy.

A system for policy based content delivery includes a mobile device, a content source, and a content server. The mobile device selects and receives content. The content source provides content selected by the mobile device to the content server. The content server detects content at a content source. The content server provides a list of detected content to the mobile device for selection by the user. The content server requests content from the content source. The content server includes a content reformatting engine to modify selected content in a manner that is in accordance with a policy.

A system for policy based content delivery includes a mobile device, a content source, and a content server. The mobile device selects and receives content. The content source provides content selected by the mobile device to the content server. The content source modifies content selected by the mobile device prior to providing the selected content to the mobile device. The content server detects content at a content source. The content server provides a list of detected content to the mobile device for selection by the user. The content server instructs the content source to provide the content in a manner that is in accordance with a policy. The content server includes a content reformatting engine to modify selected content in a manner that is in accordance with a policy.

A method for providing content in accordance with a policy includes discovering available content at a content source, requesting content located on a content source from a mobile device, processing the request from the mobile device at a content server, requesting content source to provide content in a manner that conforms to the enforcement policy, and transferring the requested content from the content source in a manner that conforms to the enforcement policy.

A computer program is stored on a computer readable storage medium. The program is executable by a processor for performing a method for providing user selected content to a mobile device. The method includes discovering available content at a content source, requesting content located on a content source from a mobile device, processing the request from the mobile device at a content server, requesting content source to provide content in a manner that conforms to the enforcement policy, and transferring the requested content from the content source in a manner that conforms to the enforcement policy.

DETAILED DESCRIPTION

Figure 1:
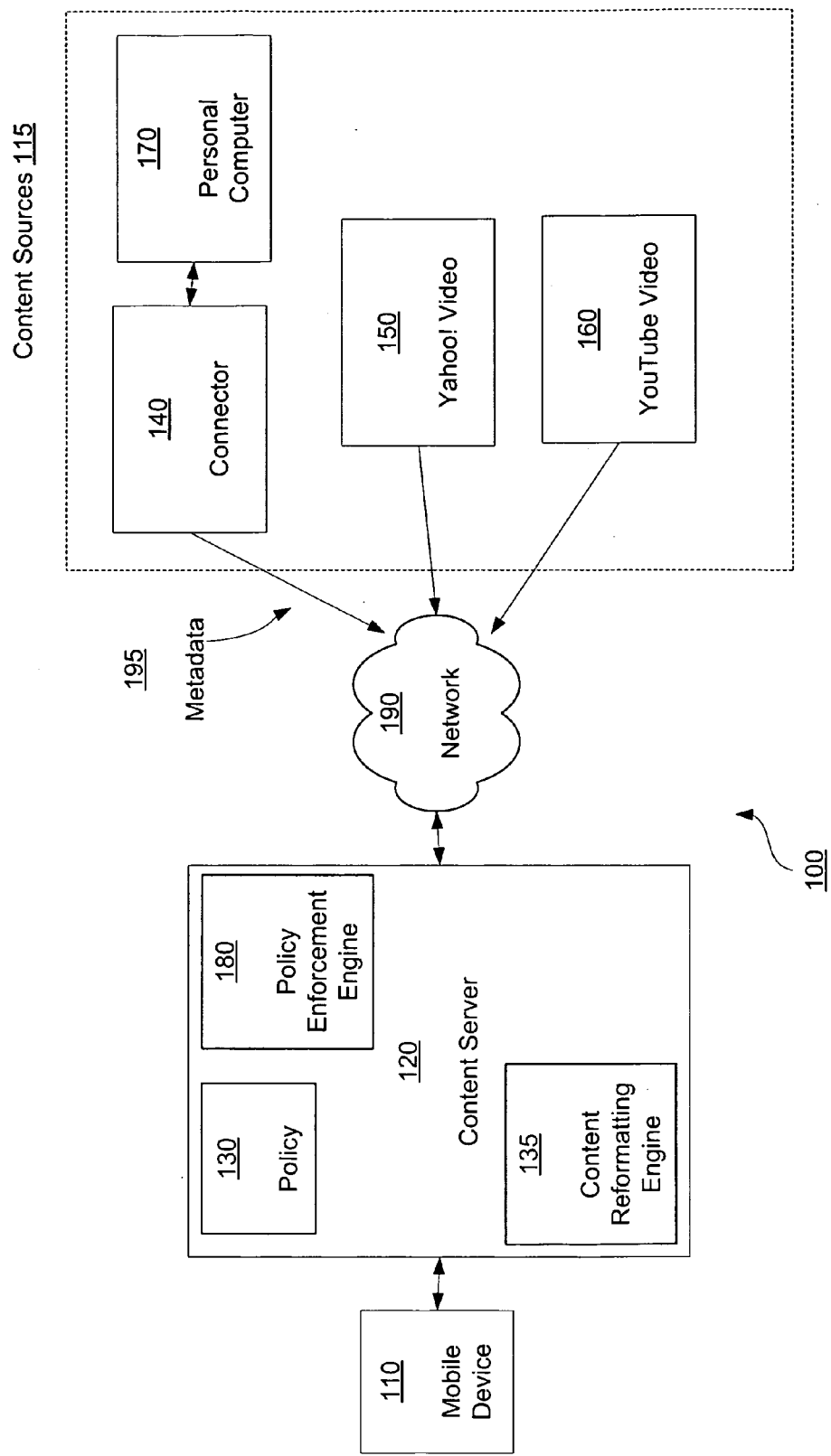
FIG. 1 depicts an exemplary system in which metadata is sent from a variety of content sources to a content server for content discovery.

FIG. 1 depicts an exemplary system 100 in which metadata is sent through a network 190 from a variety of content sources to a content server 120 for content discovery. Mobile device 110 requests content from a content source 115 as may be identified through a catalog, listing, or web pages associated with content source 115 or content server 12. Content source 115 may include a personal computer 170 or content portal such as YAHOO! Video 150 or YOUTUBE Video 160.

Content server 120 receives metadata 195 from the content source 115 and determines the information concerning the requested content such as file size, format, encoded bit rate, and DRM limitations. Policy 130 is any one or combination of service provider restrictions, mobile device capabilities, and user preferences. The content server 120 uses policy 130 to identify what type of requested content may be transferred to the mobile device 110.

Policy enforcement engine 180 ensures that requested content transferred to the mobile device 110 meets the requirements of the policy 130. This enables the service provider, for example, to enforce the service policy on the user's transmissions. The content server 120 may then instruct the content source 115 whether the requested content should be provided.

For example, the requested content may be a still image. The content source will send metadata 180 to the content server 120 indicating, for example, the format and file size of the still image. In this example, the still image may have a file size of 4 MB and be in the bitmap format. The content server 120 will then use policy 130 and policy enforcement engine 180 to determine whether the requested content can be provided "as is" from the content server 115. If not, the policy enforcement engine 180 and content reformatting engine 135 may attempt to reformat the content prior to transfer to the mobile device in order to comply with policy 130.

In this example, the policy 130 may limit the file size to 2 MB and the picture format to jpeg. The content server 110 will instruct the content source 115, if possible, to provide the requested content as 2 MB jpeg file. If not available as a 2 MB jpeg, the policy enforcement engine 180 may instruct content reformatting 135 to modify the content that is available for delivery in compliance with the policy 130. In other situations, the policy 130 may limit the bit rate at which the transfer occurs, as well as resolution, total bandwidth, and transfer protocol.

Policy 130 may be modified or set according to personal user preferences. The user may add additional limits on the manner in which content is or is not provided to the mobile device 110. For example, the user can control the quality of the audio playback and the audio format to use when receiving audio content.

In FIG. 1, the personal computer 170 includes a connector 140. The connector 140 is a software application that allows a user to configure the personal computer 170 to provide content to the mobile device 110 via content server 120. The connector 140 may be configured by the user to allow desired folders and files on the personal computer to be accessible to the mobile device. In other embodiments, the connector 140 may be connected to other content sources. Personal computer 170, in an alternate embodiment, may include the policy 130, policy enforcement engine 180, and content reformatting engine 190.

The content server 120 may be configured to reformat downloaded digital content using the content reformatting engine 135. The content reformatting engine 135 may decode, encode, transcode, or resample digital content. The content reformatting engine 135 may initiate reformatting of the downloaded content in response to a command issued by the policy enforcement engine 180 or by the mobile device 110. Reformatting may also occur automatically according to user preferences reflected in the policy 130. The content reformatting engine 135 may include copying a file while changing a file format from one format to another, or while changing a bit rate or resolution such that the copy has a different bit rate or resolution than the original.

In one example, the content reformatting engine 135 reformats an MPEG-2 encoded video file to a 3GP encoded video file by copying the MPEG-2 encoded video file and saving the copied video file in the local content store 132 as a 3GP encoded video file. In a second example, the content reformatting engine 135 reformats an AVI encoded video file having a resolution of 720 by 480 pixels to an AVI encoded video file having a resolution of 360 by 240 pixels. In another example, the content reformatting engine 135 reformats an MPEG-4 encoded video file having a frame rate of approximately 30 frames per second (fps) to an MPEG-4 encoded video file having a frame rate of approximately 15 fps. By further example, the content reformatting engine 135 reformats an MP3 encoded audio file having a bit rate of 192 kilobits per second (kbps) to an MP3 encoded audio file having a bit rate of 128 kbps.

The content reformatting engine 135 may also reformat the content based upon a factor dependent on the mobile device 110, a user-selectable preference, or a preset preference. The factor dependent on the mobile device 110 may further include supported codecs (e.g., MP3 and WMA), bit rates (i.e., bits per second), sampling rates (i.e., samples per second), sample resolutions (i.e., bits per sample), and video frame rates (i.e., frames per second). The factor dependent on the mobile device 110 may also include processing power, memory size, free available memory, screen size, and screen resolution.

The reformatting may be performed such that the reformatted digital content transferred to the mobile device 110 corresponds to an optimal data size range as determined by factors listed above. As an example, the downloaded content may be reformatted to more compact file sizes when free available memory at the mobile device 110 is low. Alternatively, the downloaded content may be reformatted to larger file sizes when free available memory at the mobile device is high. As another example, the downloaded content may be reformatted to a lower resolution screen size when the mobile device 110 is a cellular telephone than when the mobile device 120 is a PDA. The downloaded content may be reformatted to resolution somewhat larger (finer) than the screen size resolution to allow the downloaded content to be zoomed and cropped to a reasonable degree at the mobile device 110.

Figure 2:
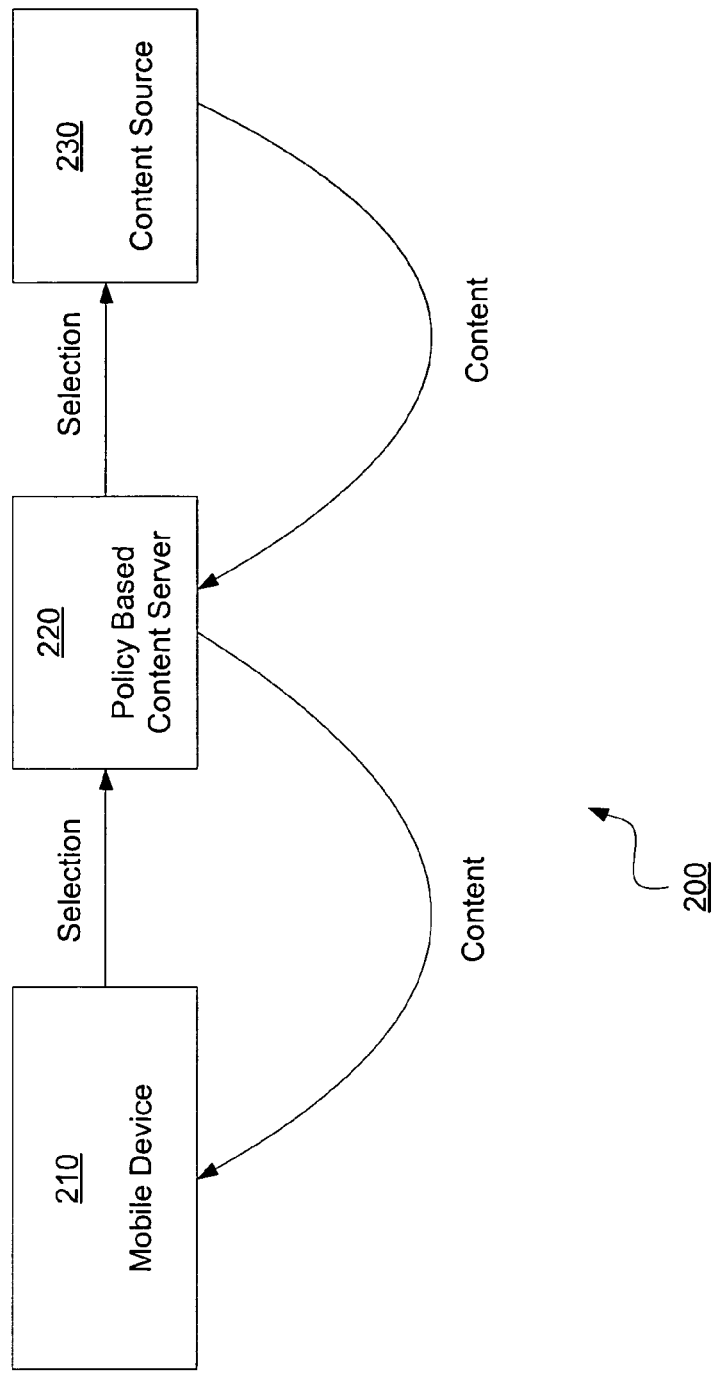
FIG. 2 depicts an exemplary system in which user selected content is sent from a content source through a policy based content server to a mobile device.

FIG. 2 depicts an exemplary system 200 in which user selected content is sent from a content source 230 through the policy based content server 220 to a mobile device 210. The policy based content server 220 corresponds to the content server 120 of FIG. 1. In this embodiment, policy enforcement occurs at the policy based content server 220.

Figure 3:
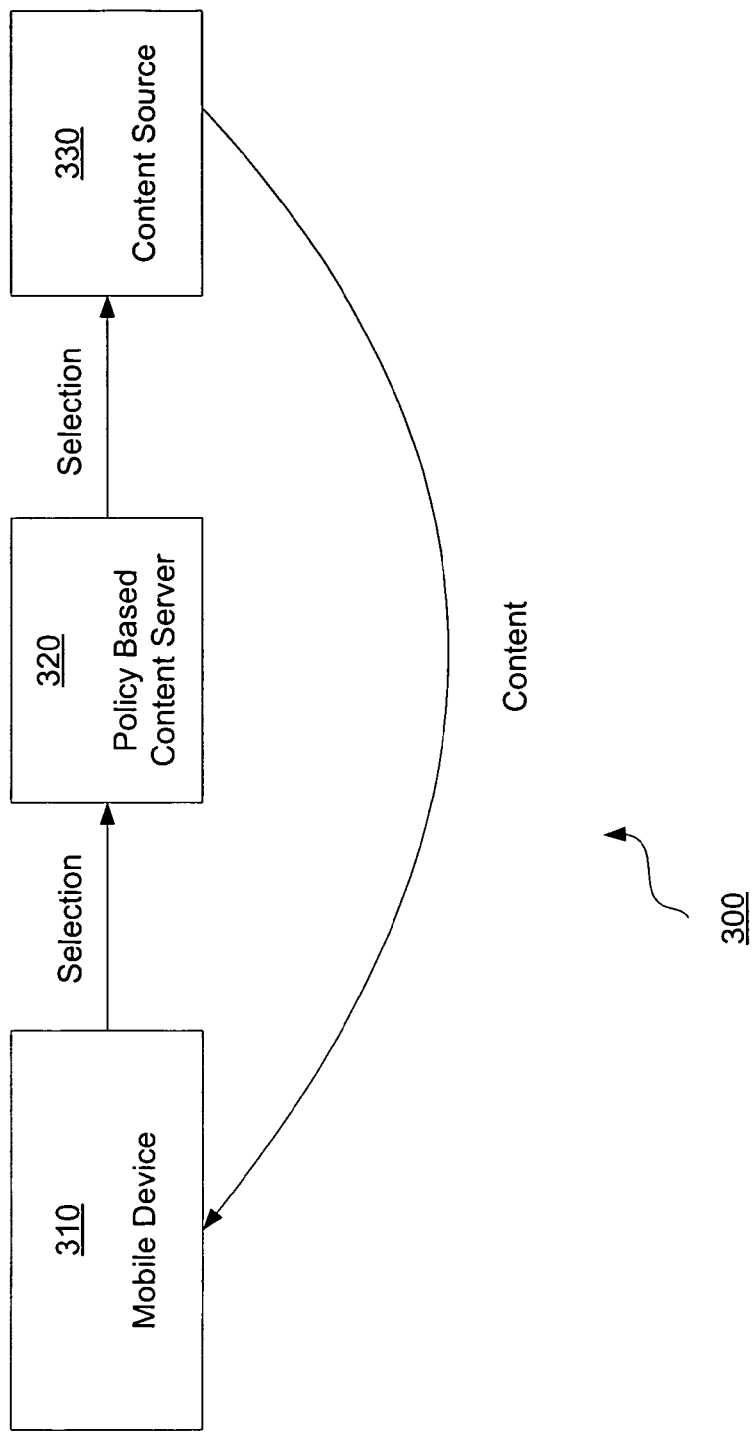
FIG. 3 depicts an exemplary system in which user selected content is sent directly from a content source with a connector to a mobile device.

FIG. 3 depicts an exemplary system 300 in which user selected content is sent directly from a content source with connector 330 to a mobile device 310. In this embodiment, the policy enforcement occurs at the content source with connector 330 as the content is not sent back through the policy based content server 320. A content source with connector 330 may be akin to the coupling or integration of the connector 140 and personal computer 170 in FIG. 1. A connector coupled to or integrated with the content source may perform policy enforcement at the content source. In some embodiments, content selection may bypass the policy based content server 320 and occur by and between mobile device 310 and content source 330.

Figure 4:
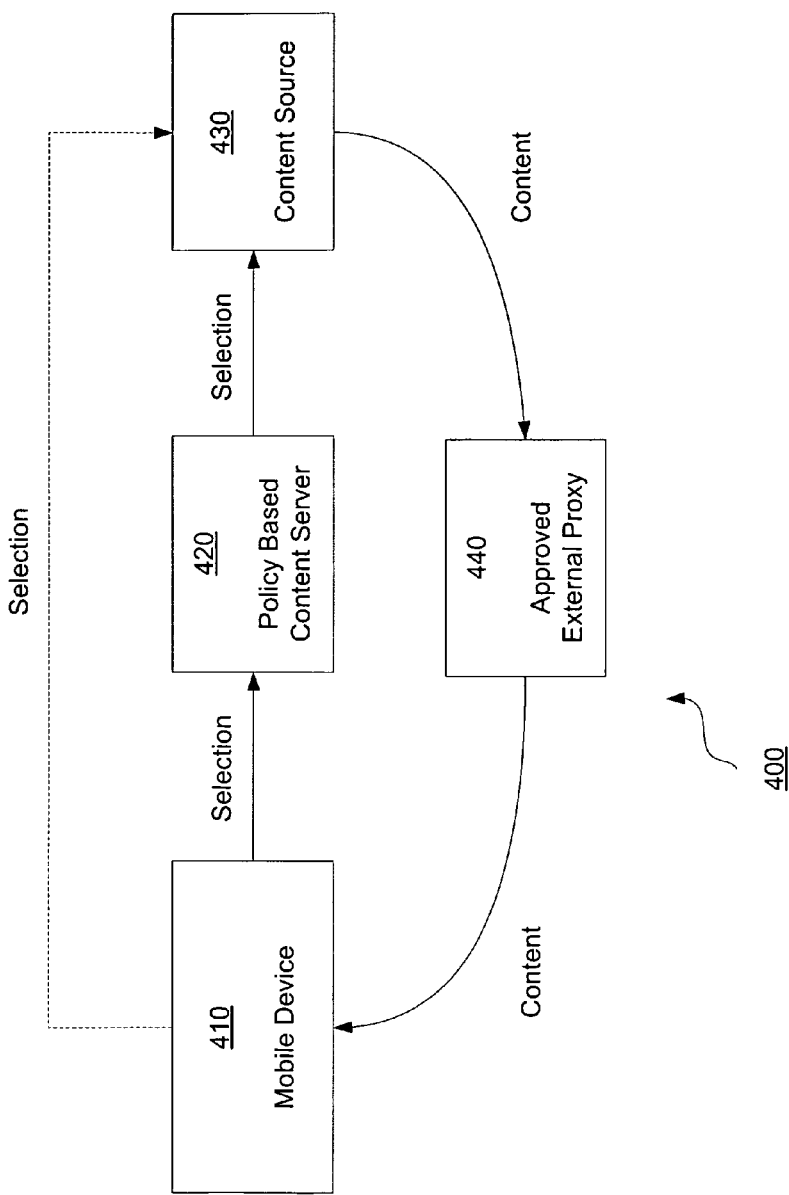
FIG. 4 depicts an exemplary system in which user selected content is sent from a content source with a connector through an approved external proxy to a mobile device.

FIG. 4 depicts an exemplary system 400 in which user selected content is sent from a content source with connector 430 through an approved external proxy 440 to a mobile device 410. The policy enforcement may occur at the content source 430 or the external approved proxy 440. Use of the external approved proxy 440 may be subject to the proxy having a connector application. The approved external proxy 440 may be a server remote from the service provider. Alternately, the external proxy 440 may be a separate server located at the same data center as the content based content server 420.

Figure 5:
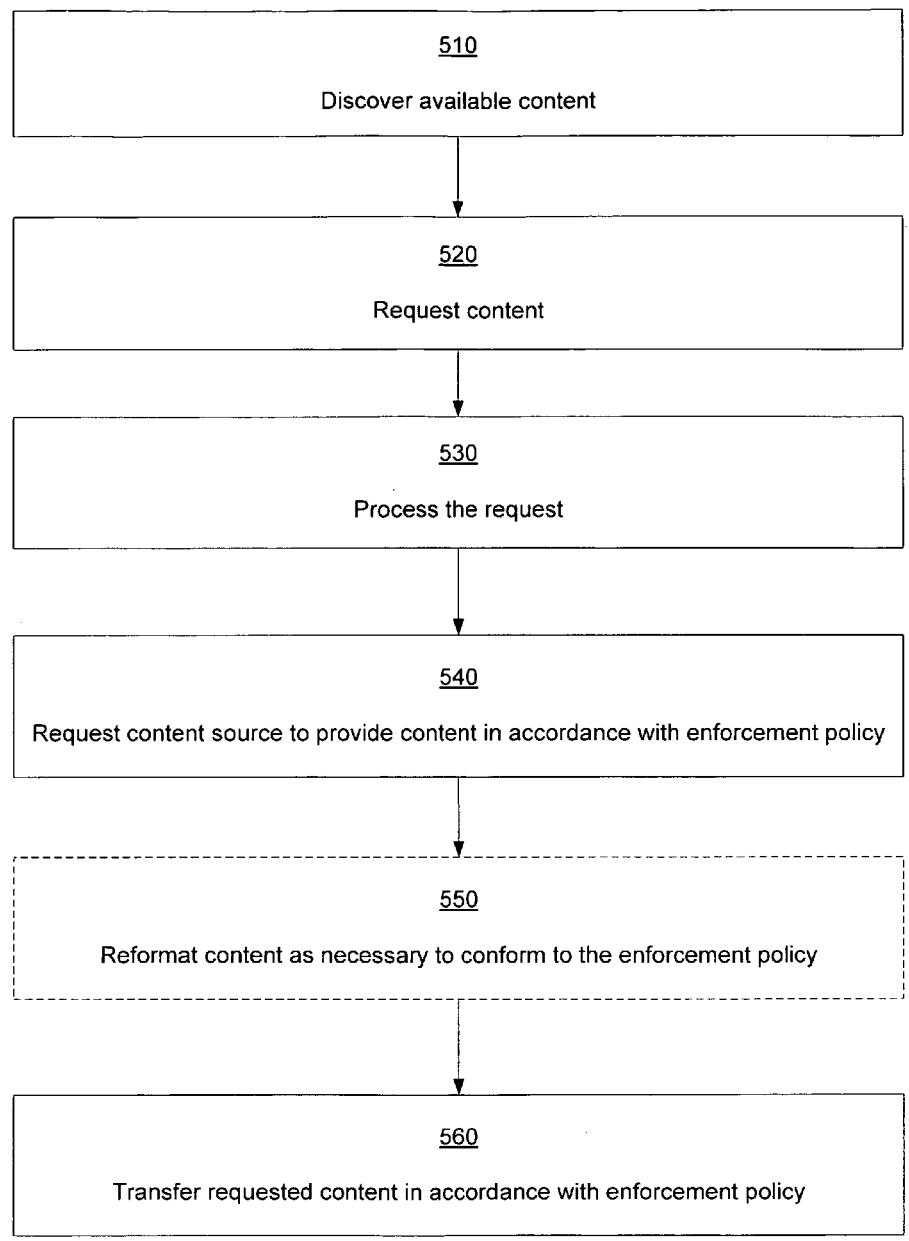
FIG. 5 depicts an exemplary method for policy based service of content.

FIG. 5 depicts an exemplary method for policy based service of content. Step 510 is the discovery of available content on a content source. Step 520 is the requesting of content located on a content source from a mobile device. Step 530 is the processing of the request from a mobile device at a content server. Step 540 is requesting the content source to provide content in a manner that conforms to a service policy. Step 550 is the optional reformatting of the selected content as necessary to conform to the enforcement policy. Step 560 is the transferred of the requested content from the content source in a manner that conforms to the enforcement policy to the mobile device.

While the present invention has been described in connection with a series of preferred embodiment, these descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A method comprising:
   forwarding, by a content server, a request for content initiated by a mobile device to content source,
      wherein the content is located at the content source;
   processing, by the content server, metadata associated with requested content to determine if whether the requested content complies with a policy, responsive to forwarding the request to the content source, the metadata associated with the requested content is received from the content source without the requested content, and
      wherein the policy includes a service provider policy to enforce service policy on the mobile device;
   instructing the content source to modify the requested response content by changing an image file or video file from a first size to a second size to comply with the policy, and
   instructing the content source to transfer the content to the mobile device.

2. The method of claim 1, wherein the requested content is transferred to the mobile device from the content source via the content server.

3. The method of claim 1, wherein the requested content is transferred to the mobile device directly from the content source.

4. The method of claim 1, wherein the requested content is transferred to the mobile device via a proxy.

5. The method of claim 1, wherein the policy specifies at least one of a file format and file size.

6. The method of claim 1, wherein the policy is further based, at least in part, on at least one of a mobile device capability and a user preference.

7. The method of claim 1, further comprising:
   instructing the content source to modify the requested content by reformatting the content from a video file having a first frame rate to a video file having a second frame rate.

8. The method of claim 1, further comprising:
   instructing the content source to modify the requested content by reformatting an image file or video file from a first file format to a second file format to comply with the policy.

9. The method of claim 1, wherein the policy specifies a bit rate.

10. The method of claim 1, wherein the policy specifies a DRM limitation.

11. The method of claim 1, wherein the request for content comprises a selection of video content from a user of the mobile device, the selection indicating the video from the list of content located at a content source.

12. The method of claim 1, wherein instructing the content source to transfer the content to the mobile device if the requested content complies with the policy comprises sending instructions to the content source directing the content source to transfer the video content to the content server.

13. The method of claim 1, further comprising:
   in response to determining that video content does not comply with the policy specifying a particular video file format, converting the file format of the video content to comply with the policy,
      wherein, the policy specifies the particular video file format, and
      wherein, the policy is, at least in part, specified by a service provider.

14. A non-transitory computer readable storage medium having programming instructions stored thereon that when executed by one or more computer processors of a content server, cause the content server to:
   forward a request for content initiated by a mobile device to a content source, the request initiated by a mobile device;
   process metadata associated with requested content to determine whether transfer of the requested content complies with a policy,
      responsive to forwarding the request to the content source, the metadata associated with the requested content is received from the content source without the requested content, and
      wherein the policy specifies a bandwidth at which transfer occurs and is, at least in part, specified by a service provider;
   instructing the content source to modify the requested response content by changing an image file or video file from a first size to a second size to comply with the policy, and
   instruct the content source to transfer the content to the mobile device.

15. The computer readable storage medium of claim 14, wherein the requested content is transferred to the mobile device via the content server.

16. The computer readable storage medium of claim 14, wherein the requested content is transferred to the mobile device directly from the content source.

17. The computer readable storage medium of claim 14, wherein the requested content is transferred to the mobile device via a proxy.

18. The computer readable storage medium of claim 14, wherein the policy specifies at least one of a file format and file size.

19. The computer readable storage medium of claim 14, wherein the policy is further based, at least in part, on mobile device capability.

20. The computer readable storage medium of claim 14, wherein the policy is based on user preferences.

21. The computer readable storage medium of claim 14, wherein the policy specifies a bit rate.

22. The computer readable storage medium of claim 14, wherein the policy specifies a DRM limitation.

23. A system comprising:
   one or more processors;
   a memory unit having programming instructions stored thereon that, when executed by the one or more processors, cause the system to:
      forward a request for content initiated by a mobile device to a content source, wherein the content is located at the content source;
      process metadata associated with requested content to determine if the requested content complies with a policy, responsive to forwarding the request to the content source, the metadata associated with the requested content is received from the content source without the requested content, and wherein the policy includes a service provider policy to enforce service policy on the mobile device;

instructing the content source to modify the requested response content by changing an image file or video file from a first size to a second size to comply with the policy, and instructing the content source to transfer the content to the mobile device.

24. The system of claim 23, wherein the requested content is transferred to the mobile device from the content source via the content server.

25. The system of claim 23, wherein the requested content is transferred to the mobile device directly from the content source or via a proxy.

26. The system of claim 23, wherein the policy specifies a file format and file size.

27. The system of claim 23, wherein the policy is based, at least in part, on at least one of a mobile device capability and a user preference.

\* \* \* \* \*